(12) United States Patent
Maeda et al.

(10) Patent No.: US 10,248,877 B2
(45) Date of Patent: Apr. 2, 2019

(54) ILLUMINATION DEVICE AND BIOMETRIC AUTHENTICATION APPARATUS

(71) Applicant: FUJITSU LIMITED, Kawasaki-shi, Kanagawa (JP)

(72) Inventors: Satoshi Maeda, Atsugi (JP); Soichi Hama, Atsugi (JP); Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/641,488

(22) Filed: Mar. 9, 2015

(65) Prior Publication Data
US 2015/0252980 A1 Sep. 10, 2015

(30) Foreign Application Priority Data
Mar. 10, 2014 (JP) .................. 2014-046934

(51) Int. Cl.
*F21V 7/00* (2006.01)
*G02B 5/18* (2006.01)
(Continued)

(52) U.S. Cl.
CPC .......... *G06K 9/2036* (2013.01); *F21V 7/0025* (2013.01); *G02B 5/1876* (2013.01); *G02B 27/44* (2013.01); *G06K 9/00013* (2013.01); *G06K 9/00033* (2013.01); *G06K 9/00046* (2013.01); *G06K 9/00067* (2013.01);
(Continued)

(58) Field of Classification Search
None
See application file for complete search history.

(56) References Cited

U.S. PATENT DOCUMENTS 6,643,390 B1 * 11/2003 Clark .................. G06K 9/00046
356/71
2002/0080491 A1 * 6/2002 Goto .................... G02B 5/1866
359/566
(Continued)

FOREIGN PATENT DOCUMENTS

EP  1610265 A1  12/2005
EP  1830123 A1  9/2007
(Continued)

OTHER PUBLICATIONS

Fok, Lo-Ming, Yun-Hui Liu, and Wen J. Li. "Prototyping of Beam Shaping Diffraction Gratings by AFM Nanoscale Patterning." IEEE Transactions on Automation Science and Engineering 7.1 (2010): 49-57.*
(Continued)

*Primary Examiner* — Kim Y Vu
*Assistant Examiner* — Nathan J Bloom
(74) *Attorney, Agent, or Firm* — Fujitsu Patent Center

(57) ABSTRACT

An illumination device includes a light source provided on a surface of a substrate and configured to emit light, and a diffraction optical element having a plurality of diffraction gratings with different pitch and rotating direction, and configured to diffract the light into illumination light that illuminates an illumination region of an illuminating target. The illuminating region is larger than an area occupied by the diffraction optical element and the light source provided on the surface of the substrate.

11 Claims, 18 Drawing Sheets

(51) Int. Cl.
*G06K 9/00* (2006.01)
*G06K 9/20* (2006.01)
*G02B 27/44* (2006.01)
*F21Y 115/10* (2016.01)

(52) U.S. Cl.
CPC ....... *G06K 9/00375* (2013.01); *G06K 9/2027* (2013.01); *F21Y 2115/10* (2016.08); *G06K 2009/00395* (2013.01)

(56) References Cited

U.S. PATENT DOCUMENTS

| | | | |
|---|---|---|---|
| 2003/0019931 A1* | 1/2003 | Tsikos | G02B 26/10 235/454 |
| 2003/0206287 A1* | 11/2003 | McClurg | G06K 9/00046 356/71 |
| 2004/0165268 A1 | 8/2004 | Turunen | |
| 2005/0254129 A1* | 11/2005 | Clark | G02B 3/08 359/573 |
| 2006/0170906 A1* | 8/2006 | Arnold | G06K 9/00046 356/71 |
| 2007/0019909 A1 | 1/2007 | Yamauchi et al. | |
| 2007/0206391 A1* | 9/2007 | Matsuo | G02B 6/0001 362/558 |
| 2008/0007671 A1 | 1/2008 | Klenke | |
| 2009/0297100 A1 | 12/2009 | Yamauchi et al. | |
| 2010/0020289 A1* | 1/2010 | Kamijima | G03B 21/208 353/31 |
| 2010/0039508 A1 | 2/2010 | Li | |
| 2010/0046807 A1 | 2/2010 | Sato | |
| 2011/0038150 A1* | 2/2011 | Woodgate | H01L 24/85 362/235 |
| 2011/0242304 A1* | 10/2011 | Ichige | G06K 9/00107 348/77 |
| 2012/0299801 A1 | 11/2012 | Kitano | |
| 2012/0321149 A1* | 12/2012 | Carver | G06K 9/0004 382/124 |
| 2013/0051635 A1* | 2/2013 | Wu | G06K 9/00046 382/124 |
| 2014/0049610 A1* | 2/2014 | Hudman | G01S 17/89 348/46 |
| 2014/0204592 A1* | 7/2014 | Miyashita | F21S 48/115 362/311.06 |
| 2016/0034772 A1* | 2/2016 | Betensky | G06K 9/0004 382/124 |

FOREIGN PATENT DOCUMENTS

| | | |
|---|---|---|
| JP | 2003-270585 A | 9/2003 |
| JP | 2004-078791 | 3/2004 |
| JP | 2004-163527 A | 6/2004 |
| JP | 2007-33576 A | 2/2007 |
| JP | 2007-233282 A | 9/2007 |
| JP | 2008-537785 | 9/2008 |
| JP | 2010-49664 A | 3/2010 |
| JP | 2013-8950 A | 1/2013 |
| WO | 2006/094993 | 9/2006 |

OTHER PUBLICATIONS

"Fresnel Lens", retrieved from Wikipedia.org, https://web.archive.org/web/20140207142540/https://en.wikipedia.org/wiki/Fresnel_lens, Established Date of Publication Feb. 7, 2014 as per cached page archival https://archive.org/web/.*

Chen, Ga-Lane et al., "Surface Modification for Advanced Light Guide Plate for TFTLCD Display", Proceedings of the 35th International MATADOR Conference, Feb. 2, 2007, pp. 67-70, XP055206370, Retrieved from the Internet: URL:https://books.google.nl/books?id=WyomxYHGfWMC&lpg=PA67&dq=Surface%20Modification%20for%20Advanced%20Light%20Guid%20Plate&hl=pl&pg=PA68#v=snippet&q=LEDs&f=false [retrieved on Aug. 5, 2015].

Cornelissen, Hugo et al., "Diffraction gratings for Lighting applications", Proceedings of SPIE, vol. 8835, Sep. 30, 2013, pp. 883501-1-883501-8, XP055203884.

Parikka, Marko et al., "Deterministic diffractive diffusers for displays", Applied Optics, Optical Society of America, Washington, DC, vol. 40, No. 14, May 10, 2001, pp. 2239-2246, XP001066038.

Sales, Tasso R.M. et al., "Light Tamers; Engineered microlens arrays provide new control for display and lighting applications," Features, Jun. 2004, Photonics Spectra, Issue 6 , vol. 38, Jun. 6, 2004, XP055204066, Retrieved from the Internet: URL:http://www.photonics.com/Article.aspx?AID=19081, [retrieved on Jul. 22, 2015], 6 pages.

Aagedal, Harald et al., "Analytical beam shaping with application to laser-diode arrays", Journal of the Optical Society of America, vol. 14, No. 7, Jul. 1, 1997, pp. 1549-1553, XP055204029.

Jiang, Xiujuan et al., "Uniform irradiation of adjustable target spots in high-power laser driver", Applied Optics, Optical Society of America, Washington, DC, vol. 50, No. 27, Sep. 20, 2011, pp. 5213-5220, XP001569249.

Extended European Search Report dated Aug. 12, 2015 for corresponding European Patent Application No. 15158180.8, 13 pages.

Office Action dated Apr. 10, 2017 and corresponding to European Patent Application No. 15158180.8 (5 pages).

Summons to attend oral proceedings dated Feb. 8, 2018 for corresponding European Patent Application No. 15158180.8, 10 pages.

Japanese Office Action dated Oct. 3, 2017 for corresponding Japanese Patent Application No. 2014-046934, with English Translation, 7 pages.

* cited by examiner

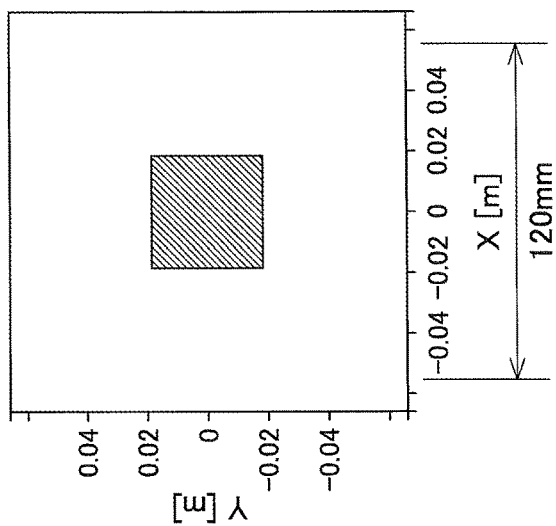
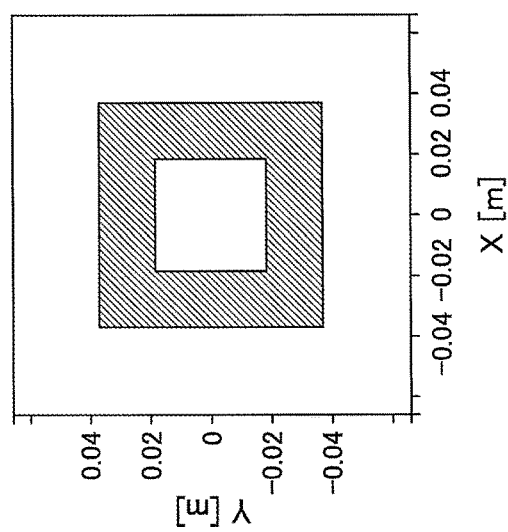
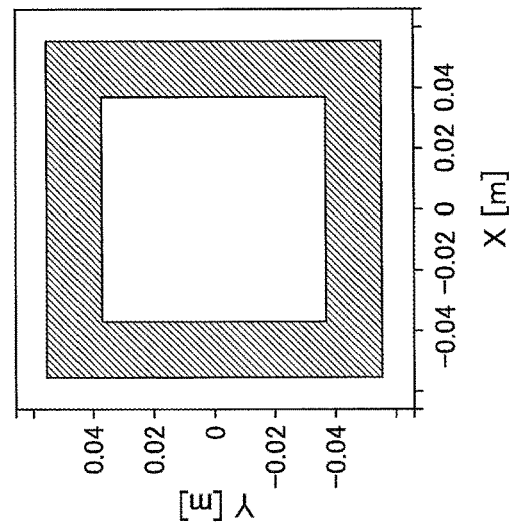

| | PIX | CELL SIZE (mm) | SIZE (mm) OF DIFFRACTION OPTICAL ELEMENT |
|---|---|---|---|
| (a) | 200 | 0.025 | 5.00 |
| (b) | 175 | 0.0285 | 5.00 |
| (c) | 150 | 0.033 | 4.95 |

ILLUMINATION DEVICE AND BIOMETRIC AUTHENTICATION APPARATUS

CROSS-REFERENCE TO RELATED APPLICATIONS

This application is based upon and claims the benefit of priority of the prior Japanese Patent Application No. 2014-046934, filed on Mar. 10, 2014, the entire contents of which are incorporated herein by reference.

FIELD

The embodiments discussed herein are related to an illumination device, a biometric authentication apparatus, and a computer-readable storage medium.

BACKGROUND

Recently, biometric authentication techniques have been developed to make contactless (or non-contact) authentication of a system user, based on an biometric image representing biometric information such as a vein pattern of a hand or finger, a fingerprint, a palmprint, or the like. A biometric authentication apparatus utilizing the biometric authentication technique collates an input biometric image representing the user's biometric information with registered biometric information representing a biometric image of a registered user registered in advance. In a case in which the input biometric information and the registered biometric information match as a result of the collating process, the biometric authentication apparatus authenticates the user as a legitimate user (that is, the registered user) who is authorized to use the system, and permits the authenticated user to use the system. For example, the biometric authentication apparatus may be built into the system, or may be externally connected to the system.

The biometric authentication apparatus is being utilized in various fields, such as log-on management to a personal computer, identify verification in an ATM (Automated Teller Machine) of a bank, access management to an office, or the like, for example. In addition, the size of the biometric authentication apparatus itself is being reduced in order to expand the range in which the biometric authentication apparatus may be applied.

In order for the biometric authentication apparatus to authenticate the user with a high accuracy, it is desirable that a feature configuration of the biometric information clearly appears on the biometric image. For this reason, a sensor used in the biometric authentication apparatus to generate the biometric image may be provided with an illuminating optical system that irradiates illumination light on a capturing target such as the user's hand, in addition to an imaging optical system that captures the biometric information of the capturing target such as the user's hand using an imaging lens and an imaging device such as a CCD (Charged Coupled Device).

For example, Japanese Laid-Open Patent Publication No. 2004-78791 proposes a biometric authentication technique using the illuminating optical system and the imaging optical system. According to this proposed biometric authentication technique, the illuminating optical system is formed by a plurality of light emitting diodes that are arranged two-dimensionally to a size greater than or equal to a biometric region of the capturing target, in order to irradiate the illumination light on a relatively large biometric region.

On the other hand, Japanese National Publication of International Patent Application No. 2008-537785, for example, proposes an illuminating optical system technique for screen illumination. According to this proposed illuminating optical system, the screen is segmented into predetermined regions, and a number of point light sources corresponding to the number of segmented regions are arranged. In addition, an optical guide element with a surface provided with a diffraction surface element having the same size as the screen is arranged between the point light sources and the screen, in order to convert light from the point light sources into parallel light (or rays) and irradiate the screen with illumination light having a uniform intensity distribution.

However, according to the proposed techniques described above, the size of the illuminating optical system is greater than or equal to an illuminating region that is irradiated by the illumination light, and it is difficult to apply the proposed techniques to the biometric authentication apparatus that is being reduced in size.

Conventionally, it is difficult to irradiate the illumination light with a uniform intensity distribution on the illuminating region that is larger than the illumination device.

SUMMARY

Accordingly, it is an object in one aspect of the embodiment to irradiate illumination light with a uniform intensity distribution on an illuminating region that is larger than an illumination device.

According to one aspect of the embodiment, an illumination device includes a light source provided on a surface of a substrate and configured to emit light; and a diffraction optical element having a plurality of diffraction gratings with different pitch and rotating direction, and configured to diffract the light into illumination light that illuminates an illumination region of an illuminating target, wherein the illuminating region is larger than an area occupied by the diffraction optical element and the light source provided on the surface of the substrate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 18A, 18B, and 18C are diagrams respectively illustrating measured results of the illuminating region parts of the illuminating region corresponding to first, second, and third illuminating regions;

DESCRIPTION OF EMBODIMENTS

Preferred embodiments of the present invention will be described with reference to the accompanying drawings.

A description will now be given of the illumination device and the biometric authentication apparatus in each embodiment according to the present invention.

In order to irradiate illumination light from an illumination device on an illuminating region that is larger than the illumination device, it is conceivable to utilize spreading of the illumination light by increasing a distance between the illumination device and the illuminating region, for example. However, a contrast distribution is generated in the illuminating region, depending on an arrangement of a light source of an illuminating optical system with respect to an imaging optical system, a characteristic of a lens that spreads the illumination light, or the like, thereby making it difficult to obtain a uniform intensity distribution of the illumination light that irradiates the illuminating region. On the other hand, it is conceivable to make the intensity distribution of the illumination light uniform by diffusing the illumination light from the light source of the illuminating optical system, however, the intensity of the illumination light that is irradiated on the illuminating region decreases in this case due to the light diffusion. Hence, it is difficult to simultaneously irradiate the illumination light from the illumination device on the illuminating region that is larger than the illumination device with a uniform intensity distribution and prevent the decrease in the intensity of the illumination light irradiated on the illuminating region.

Figure 1:
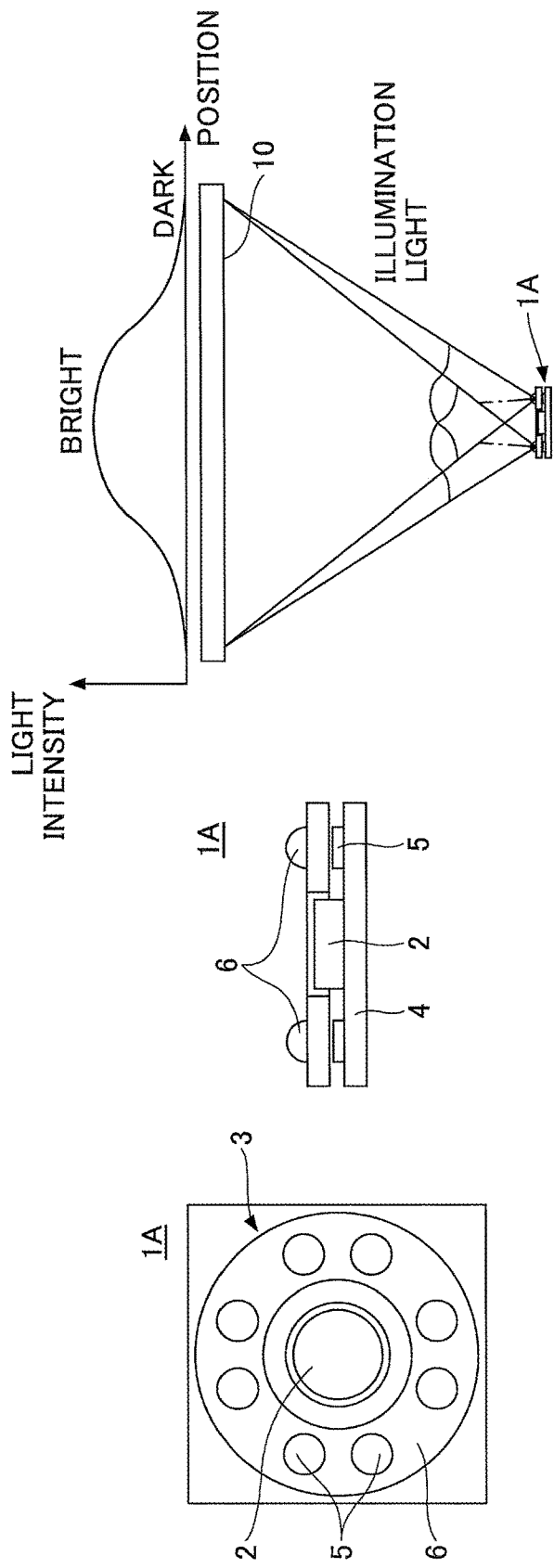
FIGS. 1A, 1B, and 1C are diagrams for explaining a first example of a sensor for a biometric authentication apparatus.

FIGS. 1A, 1B, and 1C are diagrams for explaining a first example of a sensor for a biometric authentication apparatus. FIG. 1A is a top view of the sensor for the biometric authentication apparatus, FIG. 1B is a schematic side view of the sensor for the biometric authentication apparatus, and FIG. 1C is a diagram schematically illustrating the illumination light and the illumination distribution of the sensor for the biometric authentication apparatus. A sensor 1A for the biometric authentication apparatus includes an imaging optical system 2 including a camera or the like, and an illuminating optical system 3. The illuminating optical system 3 includes a plurality of LEDs (Light Emitting Diodes) 5, and a lens array 6. Eight LEDs 5 are provided in this example. As illustrated in FIG. 1A, the LEDs 5 are arranged in a ring-shape on an outer side of the imaging optical system 2, and the lens array 6 is provided in a ring-shape so as to oppose the LEDs 5.

As illustrated in FIG. 1C, illumination light from each LED 5 is spread by the lens array 6 and irradiated on an illuminating region 10 of a biometric capturing target. As illustrated in an upper part of FIG. 1C, the intensity (arbitrary units) of the illumination light differs depending on the position (arbitrary units) on the illuminating region 10. In this example, the light intensity at a central part of the illuminating region 10 is higher than the light intensity at other parts of the illuminating region 10. Accordingly, a contrast distribution (that is, a distribution with bright and dark regions) is generated in the illuminating region 10, depending on the arrangement of the LEDs 5 and the characteristic of the lens array 6, or the like, thereby making it difficult to obtain a uniform intensity distribution of the illumination light that irradiates the illuminating region 10.

Figure 2:
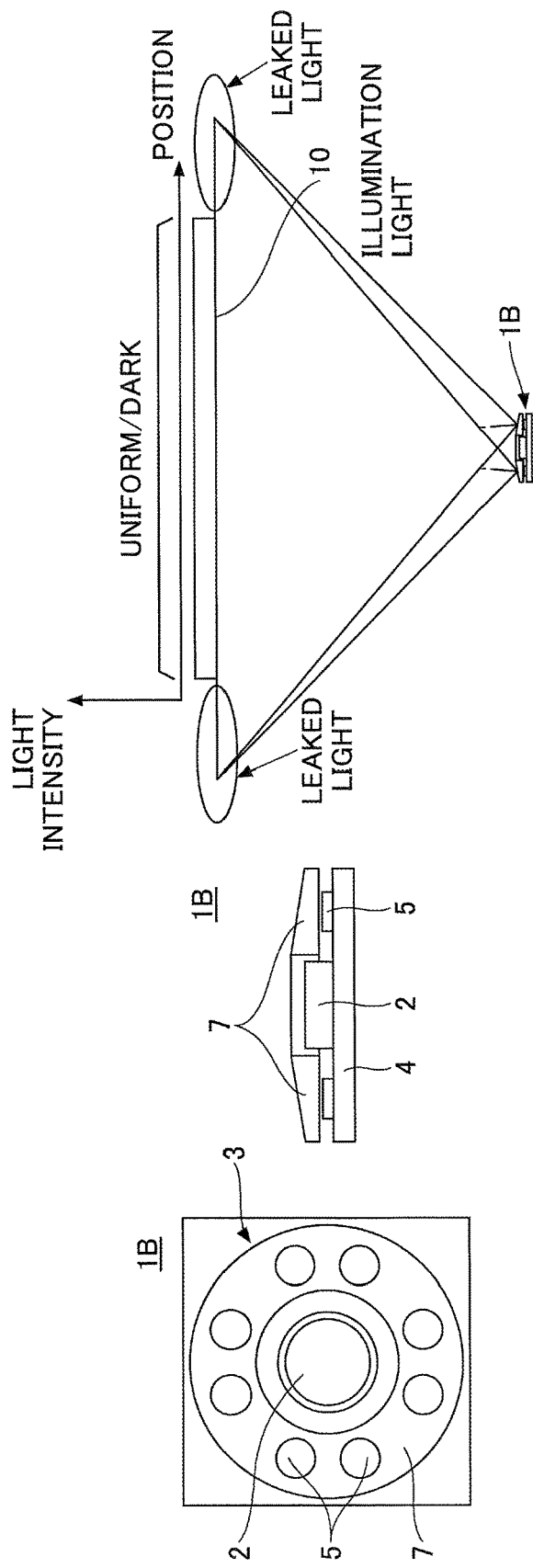
FIGS. 2A, 2B, and 2C are diagrams for explaining a second example of the sensor for the biometric authentication apparatus.

FIGS. 2A, 2B, and 2C are diagrams for explaining a second example of the sensor for the biometric authentication apparatus. FIG. 2A is a top view of the sensor for the biometric authentication apparatus, FIG. 2B is a schematic side view of the sensor for the biometric authentication apparatus, and FIG. 2C is a diagram schematically illustrating the illumination light and the illumination distribution of the sensor for the biometric authentication apparatus. In FIGS. 2A through 2C, those parts that are the same as those corresponding parts in FIGS. 1A through 1C are designated by the same reference numerals, and a description thereof will be omitted. In a sensor 1B for the biometric authentication apparatus illustrated in FIGS. 2A and 2B, a diffusion light guide plate 7 is provided in place of the lens array 6 illustrated in FIGS. 1A and 1B, and is arranged in a ring shape to oppose the LEDs 5. As illustrated in FIG. 2C, the illumination light from each LED 5 is diffused by the diffusion light guide plate 7 and irradiated on the illuminating region 10 of the biometric capturing target. As illustrated in an upper part of FIG. 2C, the intensity (arbitrary units) of the illumination light is approximately uniform regardless of the position (arbitrary units) on the illuminating region 10. However, the diffused illumination light is irradiated over a region larger than the illuminating region 10, and at an outer side of the illuminating region 10, leaked light is wasted. An increase in the leaked light at parts surrounded by ovals in FIG. 2C decreases the intensity of the illumination light. Hence, in order to prevent the intensity of the illumination light from decreasing, it is conceivable to increase the number of LEDs 5 or to use LEDs 5 having a high output. However, the size of the illuminating optical system 2 increases when the number of LEDs 5 is increased. In addition, when the LEDs 5 having the high output are used, the size of the illuminating optical system 2 increases because a high-output LED in general has a relatively large size due to countermeasures taken against heat.

Figure 3:
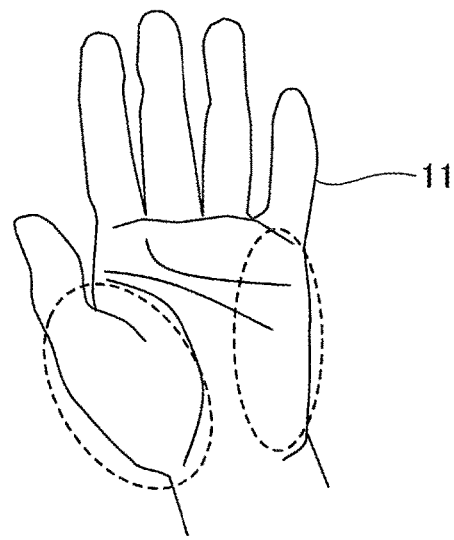
FIG. 3 is a diagram illustrating a palm that is an example of a biometric capturing target.

On the other hand, an authentication accuracy of the biometric authentication apparatus may deteriorate due to differences amongst individual biometric capturing targets. The biometric capturing target includes concavo-convex, and the size of the concavo-convex differs depending on the individual. In a case in which the biometric capturing target (or biometric authenticating target) is a palm of a hand, for example, the concavo-convex of the palm differs depending on the individual according to muscles on the palm. FIG. 3 is a diagram illustrating the palm that is an example of the biometric capturing target. As illustrated in FIG. 3, a central part of a palm 11, and peripheral parts of the palm 11, surrounded by dotted lines, have differences in elevation, and these differences in elevation differs by a relatively large amount depending on the individual.

Figure 4A:
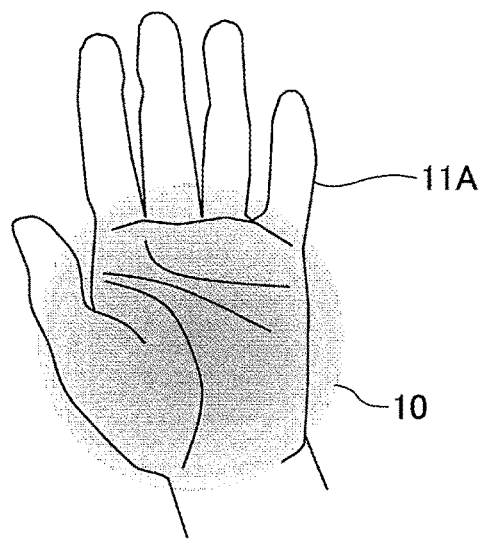
FIGS. 4A and 4B are diagrams respectively illustrating a palm with small concavo-convex and a palm with large concavo-convex.
Figure 4B:
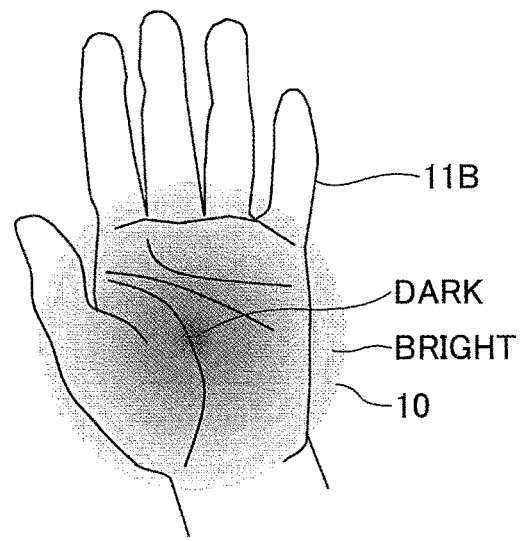

FIGS. 4A and 4B are diagrams respectively illustrating a palm with small concavo-convex and a palm with large concavo-convex. For example, even in a case in which the illumination light from the illuminating optical system 2 has a satisfactory illumination distribution within the illuminating region 10 with respect to a person having small muscles on a palm 11A with the small concavo-convex as illustrated in FIG. 4A, for example, this illumination light does not necessarily have the satisfactory illumination distribution within the illuminating region 10 with respect to a person having large muscles on a palm 11B with the large concavo-convex as illustrated in FIG. 4B, for example. In other words, in the case of the palm 11B, the peripheral part of the palm 11B becomes bright while the central part of the palm 11B becomes dark when the illumination light irradiates the illuminating region 10, and the illumination light does not necessarily have the satisfactory illumination distribution within the illuminating region 10. In addition, a reflectivity of the palm may differ depending on a skin color of the individual. As a result, an optimum illumination condition with respect to the individual biometric capturing target differs depending on the size of the concavo-convex of the biometric capturing target (for example, small or large muscles on the palm), and the position of the concavo-convex of the biometric capturing target. Hence, under the same illumination condition, qualities of the captured images that are obtainable differ depending on the size and the position of the concavo-convex of the biometric capturing target. Consequently, the authentication accuracy of the biometric authentication apparatus may deteriorate depending on a combination of the size of the concavo-convex of the biometric capturing target and the illumination condition. It is conceivable to increase the number of LEDs 5 or to use high-output LEDs for the LEDs 5, in order to prevent the deterioration of the authentication accuracy. However, the size of the illuminating optical system 2 increases when the number of LEDs 5 is increased. Further, when the high-output LEDs 5 are used, the size of the illuminating optical system 2 increases because the high-output LED in general has a relatively large size due to countermeasures taken against heat.

Accordingly, one embodiment irradiates the illumination light with a uniform intensity distribution on the illuminating region that is larger than the illumination device. In addition, one embodiment prevents the authentication accuracy of the biometric authentication apparatus from deteriorating.

Figure 5A:
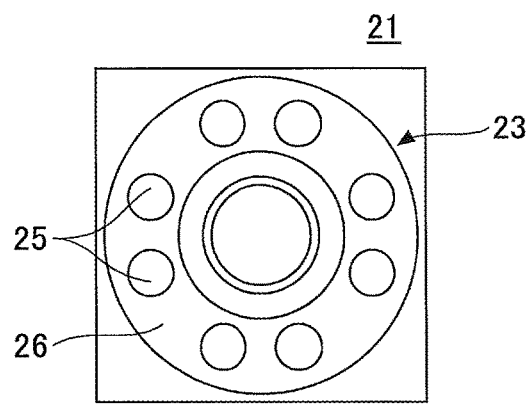
FIGS. 5A and 5B are diagrams for explaining an example of an illumination device in a first embodiment.
Figure 5B:
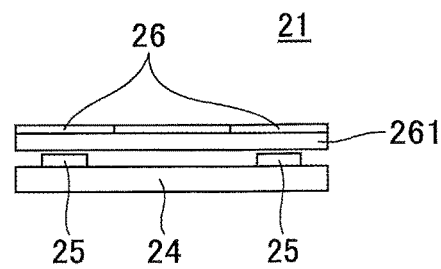

FIGS. 5A and 5B are diagrams for explaining an example of the illumination device in a first embodiment. FIG. 5A is a top view of the illumination device, and FIG. 5B is a schematic side view of the illumination device. An illumination device 21 includes an illuminating optical system 23 having a plurality of LEDs 25 provided on a substrate 24, and a diffraction optical element 26. Eight LEDs 25 are provided in this example. As illustrated in FIG. 5A, the LEDs 25 are arranged in a ring-shape, and the diffraction optical element 26 is provided in a ring-shape on a light emitting surface side of the LEDs 25 so as to oppose the LEDs 25. In this example, the illumination device 21 is applied to palm vein authentication, and for this reason, the LED 25, which is an example of a light source, has a wavelength band that may be regarded as a single color. However, the wavelength of the light emitted from the light source, and the characteristics (or properties) of the light source may be appropriately selected according to the usage of the illumination device 21.

As illustrated in FIG. 5B, the diffraction optical element 26 is formed on a surface of a substrate 261 that is made of glass or plastic, for example. In this example, the diffraction optical element 26 is formed on a light emitting surface of the substrate 261, from which the light from the LEDs 26 is emitted, and which is located on a side opposite from a light incident surface of the substrate 261, to which the light from the LED 25 becomes incident. More particularly, the light emitting surface of the substrate 261 is located on the upper side of the substrate 261 in FIG. 5B. However, the diffraction optical element 26 may be formed on the light incident surface of the substrate 261, located on the lower side of the substrate 261 in FIG. 5B. The diffraction optical element 26 can be designed by taking into consideration effects of a refractive index that is determined by the material and thickness of the substrate 261. A gap between the light emitting surface of the LED 25 and a light incident surface of the diffraction optical element 26 (that is, the light incident surface of the substrate 261) is preferably greater than zero (0), however, this gap may be zero (0).

Figure 6A:
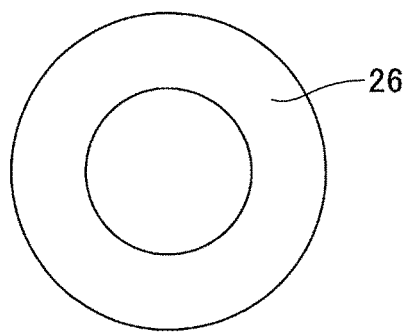
FIGS. 6A and 6B are top views respectively illustrating examples of an arrangement of a diffraction optical element.
Figure 6B:
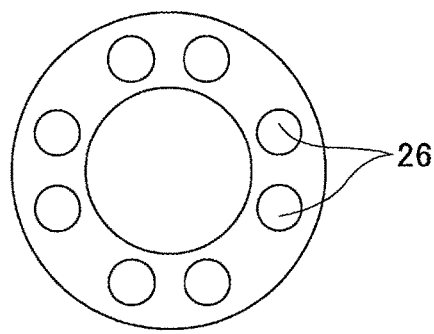

FIGS. 6A and 6B are top views respectively illustrating examples of an arrangement of the diffraction optical element. The diffraction optical element 26 may be formed with respect to the entire surface of the substrate 261, as illustrated in FIG. 6A. Alternatively, the diffraction optical element 26 may be formed only on parts of the substrate 261 irradiated by the light from the LEDs 25, as illustrated in FIG. 6B.

In this embodiment, the LEDs 25 and the diffraction optical element 26 are arranged in the ring-shape. However, the LEDs 25 and the diffraction optical element 26 may be arranged in a lattice shape, for example. The arrangement of the LEDs 25 and the diffraction optical element 26 may be appropriately modified according to the size, shape, or the like of the illumination device 21. In addition, in the case in which the diffraction optical element 26 is formed only on parts of the substrate 261 as illustrated in FIG. 6B, the diffraction optical element 26 may be arranged according to the arrangement of the LEDs 25.

Figure 7:
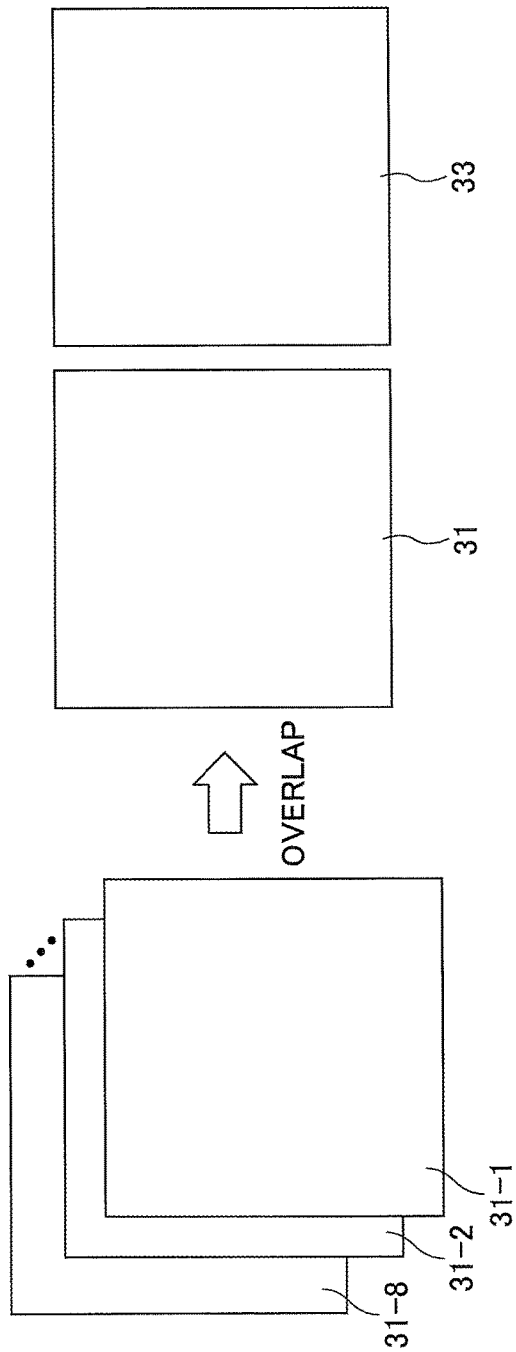
FIG. 7 is a diagram for explaining an example in which an intensity of illumination light in an illuminating region has a uniform distribution in accordance with a shape of a biometric region to be irradiated by the illumination light.

FIG. 7 is a diagram for explaining an example in which the intensity of the illumination light in the illuminating region has a uniform distribution in accordance with the shape of a biometric region to be irradiated by the illumination light. The light from the LEDs 25 is diffracted by the diffraction optical element 26 into the illumination light that illuminates a number of irradiated regions 31-1 through 31-8 corresponding to the number of LEDs 25 (eight LEDs 25 in this example). The light intensity distribution in each of the irradiated regions 31-1 through 31-8 is uniform. The shape of each of the irradiated regions 31-1 through 31-8 is the same as that of an illuminating region (or biometric region to be irradiated) 33 to be illuminated by the illumination light. Accordingly, by diffracting the light from the eight LEDs 25 by the diffraction optical element 26 to the same position on the biometric capturing target, and aligning the positions of the irradiated regions 31-1 through 31-8 that are overlapped to obtain a single irradiated region 31 of the illumination device 21, the light intensity distribution in the single irradiated region 31 becomes uniform. In addition, the shape of the single irradiated region 31 becomes the same as the shape of the illuminating region 33. Hence, a diffraction characteristic of the diffraction optical element 26 becomes different for each of the parts irradiated with the light from each of the LEDs 25. The number of LEDs 25 may be adjusted according to the brightness or the like obtained on the biometric capturing target or the illuminating region 33.

Figure 8:
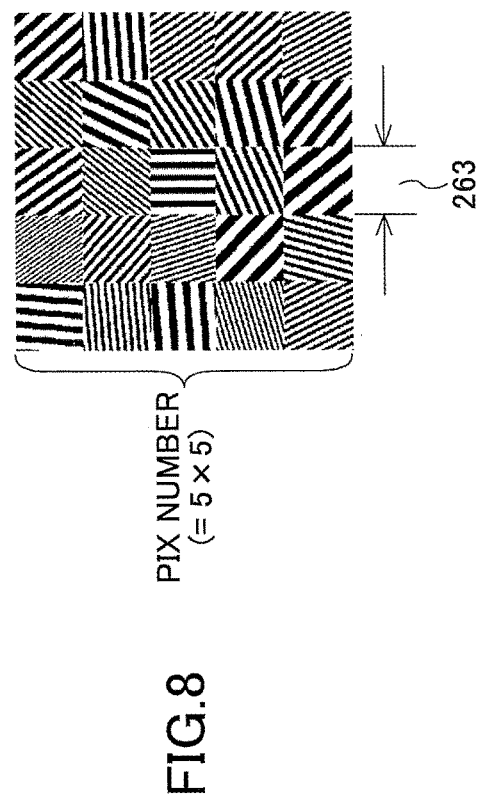
FIG. 8 is a top view illustrating an example of diffraction gratings of the diffraction optical element.

FIG. 8 is a top view illustrating an example of diffraction gratings of the diffraction optical element. In this example, the diffraction optical element 26 includes a plurality of diffraction gratings (hereinafter also referred to as "cells") 263 arranged in a matrix arrangement. In this example, the diffraction optical element 26 includes twenty-five cells 263. A pitch and a rotating direction may be mutually different amongst each of the cells 263. The cell 263 is not limited to the rectangular shape, and the arrangement of the cells 263 is not limited to the matrix arrangement. The number of cells 263 is not limited to a certain number. In the following description, a number of cells 263 along one side of the diffraction optical element 26 will be referred to as "a pixel number PIX".

Figure 9B:
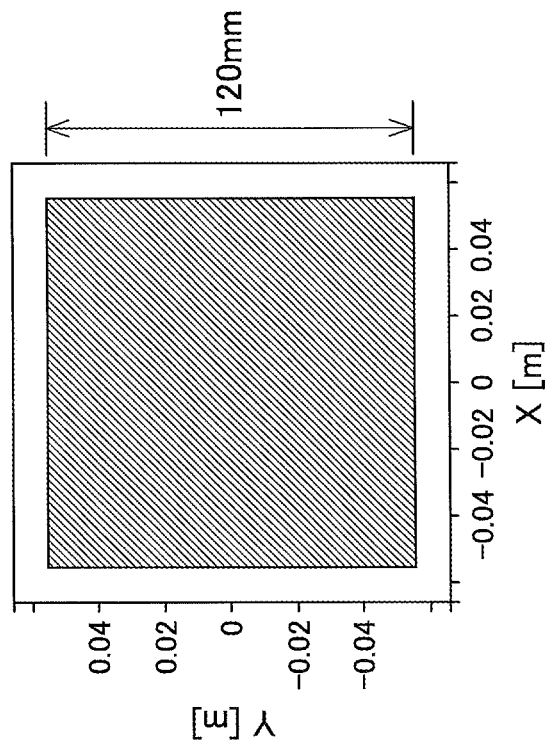
FIGS. 9A and 9B are diagrams for explaining an example of a configuration of the diffraction optical element.
Figure 9A:
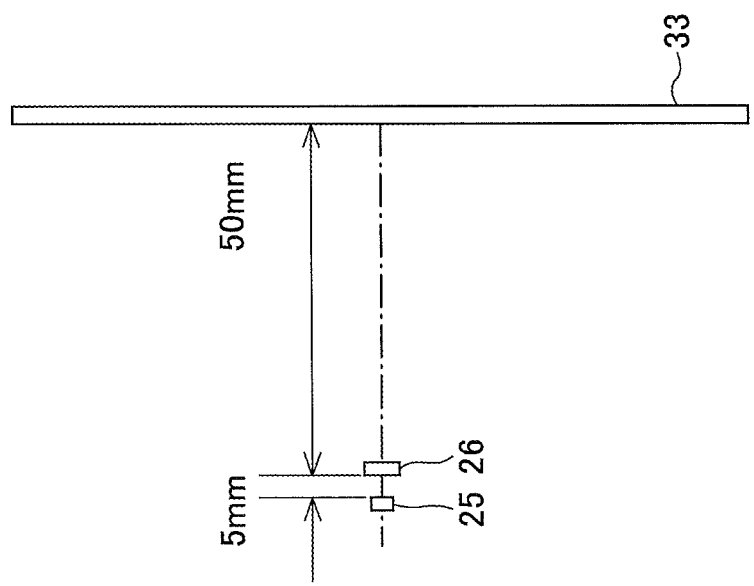

FIGS. 9A and 9B are diagrams for explaining an example of a configuration of the diffraction optical element. FIG. 9A illustrates a positional relationship of the LED 25, the diffraction optical element 26, and the illuminating region 33. FIG. 9B illustrates a measured result of the illuminating region 33. In this example, the illuminating region 33 has a rectangular shape with a size of 110 mm×110 mm. The light emitting surface of the LED 25 has a rectangular shape with a size of 3 mm×3 mm, and has a light emission wavelength of 545 nm. A gap between the LED 25 and the diffraction optical element 26 is 5 mm. The substrate 261 of the diffraction optical element 26 is made of synthetic quartz, and has a thickness of 2 mm. A gap between the diffraction optical element 26 and the illuminating region 33 is 50 mm. In a case in which the diffraction optical element 26 has a rectangular shape with a size of 5 mm×5 mm, the pixel number PIX of the diffraction optical element 26 is 250, and the cell 263 has a rectangular shape with a size of 0.02 mm×0.02 mm, the light intensity distribution is uniform in the illuminating region 33 larger than an area of the illumination device 21 in the top view, as indicated by hatchings in FIG. 9B. The area of the illumination device 21 in the top view refers to the area occupied by at least the diffraction optical element 26 and the LED 25 (that is, light source) provided on the surface of the substrate 24. In FIG. 9B, Y [m] corresponds to the position along an up-and-down direction in FIG. 9A, for example, and X [m] corresponds to the position along a direction perpendicular to the paper (or drawing surface) in FIG. 9A, for example. A light emission center wavelength of the LED 25 may be a near-infrared wavelength that is generally used by the biometric authentication apparatus or the sensor for the biometric authentication apparatus. Further, the cells 263 and the pixel number PIX of the diffraction optical element 26 for obtaining the required illuminating region 33 may be designed based on the the light emission center wavelength. The substrate 24 is not limited to synthetic quartz, and plastic materials easily usable in the biometric authentication apparatus, such as acrylic and polycarbonate materials, may be used for the substrate 24. The cells 263 and the pixel number PIX of the diffraction optical element 26 for obtaining the required illuminating region 33 may be designed based on conditions for forming the entire optical system.

Figure 10B:
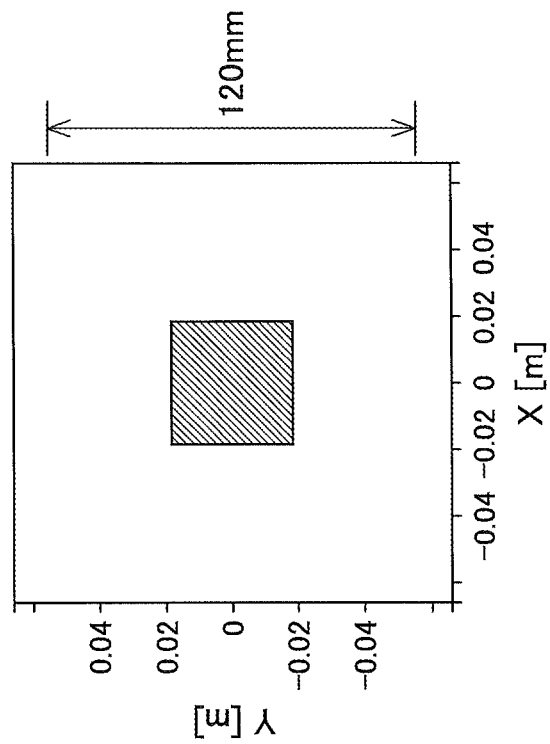
FIGS. 10A and 10B are diagrams for explaining another example of the configuration of the diffraction optical element.
Figure 10A:
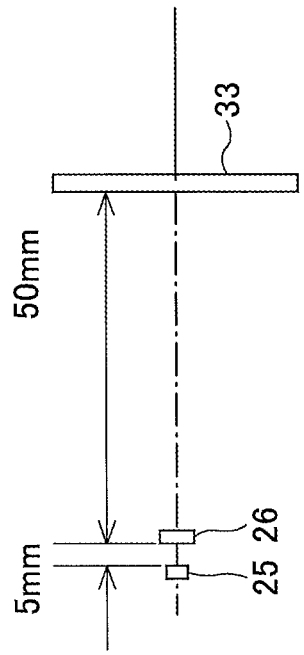

FIGS. 10A and 10B are diagrams for explaining another example of the configuration of the diffraction optical element. FIG. 10A illustrates a positional relationship of the LED 25, the diffraction optical element 26, and the illuminating region 33. FIG. 10B illustrates a measured result of the illuminating region 33. In this example, the illuminating region 33 has a rectangular shape with a size of 37 mm×37 mm which is smaller than that illustrated in FIG. 9A. The light emitting surface of the LED 25 has a rectangular shape with the size of 3 mm×3 mm, and has the light emission wavelength of 545 nm. The gap between the LED 25 and the diffraction optical element 26 is 5 mm. The substrate 261 of the diffraction optical element 26 is made of the synthetic quartz, and has the thickness of 2 mm. The gap between the diffraction optical element 26 and the illuminating region 33 is 50 mm. In a case in which the diffraction optical element 26 has a rectangular shape with a size of 4.95 mm×4.95 mm, the pixel number PIX of the diffraction optical element 26 is 150, and the cell 263 has a rectangular shape with a size of 0.033 mm×0.033 mm, the light intensity distribution is uniform in the illuminating region 33 larger than the area of the illumination device 21 in the top view, as indicated by hatchings in FIG. 10B. The area of the illumination device 21 in the top view refers to the area occupied by at least the diffraction optical element 26 and the LED (that is, light source) provided on the surface of the substrate 24. In FIG. 10B, Y [m] corresponds to the position along an up-and-down direction in FIG. 10A, for example, and X [m] corresponds to the position along a direction perpendicular to the paper (or drawing surface) in FIG. 10A, for example. The light emission center wavelength of the LED 25 may be the near-infrared wavelength that is generally used by the biometric authentication apparatus or the sensor for the biometric authentication apparatus. Further, the cells 263 and the pixel number PIX of the diffraction optical element 26 for obtaining the required illuminating region 33 may be designed based on the light emission center wavelength. The substrate 24 is not limited to the synthetic quartz, and the plastic materials easily usable in the biometric authentication apparatus, such as the acrylic and polycarbonate materials, may be used for the substrate 24. The cells 263 and the pixel number PIX of the diffraction optical element 26 for obtaining the required illuminating region 33 may be designed based on conditions for forming the entire optical system.

As illustrated in FIGS. 9A, 9B, 10A, and 10B, the diffraction optical element 26 is an assembly of diffraction gratings arranged along one side and having the pixel number PIX according to the size (that is, the area) of the illuminating region 33. In a case in which the pixel number PIX is not easily modifiable due to manufacturing constraints or the like, the size of the cells 263 (that is, the cell size) may be varied according to the size of the illuminating region 33.

Figure 11A:
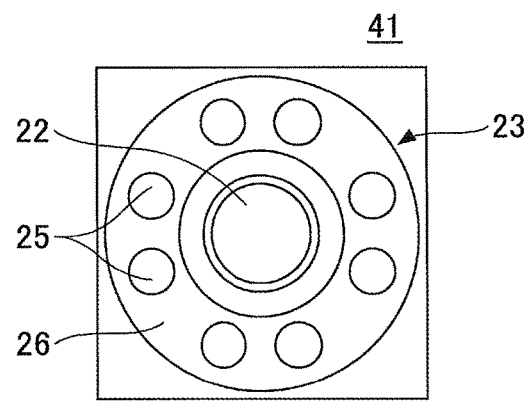
FIGS. 11A and 11B are diagrams for explaining an example of the sensor for the biometric authentication apparatus in a second embodiment.
Figure 11B:
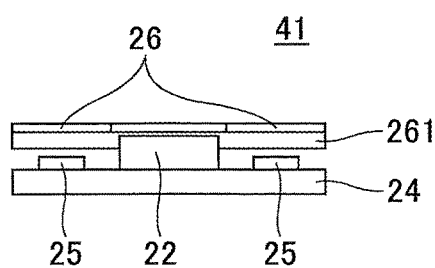

FIGS. 11A and 11B are diagrams for explaining an example of the sensor for the biometric authentication apparatus in a second embodiment. In FIGS. 11A and 11B, those parts that are the same as those corresponding parts in FIGS. 5A and 5B are designated by the same reference numerals, and a description thereof will be omitted. FIG. 11A is a top view of the sensor for the biometric authentication apparatus, and FIG. 11B is a schematic side view of the sensor for the biometric authentication apparatus. A sensor 41 for the biometric authentication apparatus includes the imaging optical system 22 including the camera or the like, and the illuminating optical system 23. The illuminating optical system 23 includes the plurality of LEDs 25 provided on the substrate 24, and the diffraction optical element 26. Eight LEDs 25 are provided in this example. As illustrated in FIG. 11A, the LEDs 25 are arranged in a ring-shape, and the diffraction optical element 26 is provided in a ring-shape on the light emitting surface side of the LEDs 25 so as to oppose the LEDs 25. The diffraction optical element 26 may have the arrangement illustrated in FIG. 6A, or the arrangement illustrated in FIG. 6B.

Figure 12:
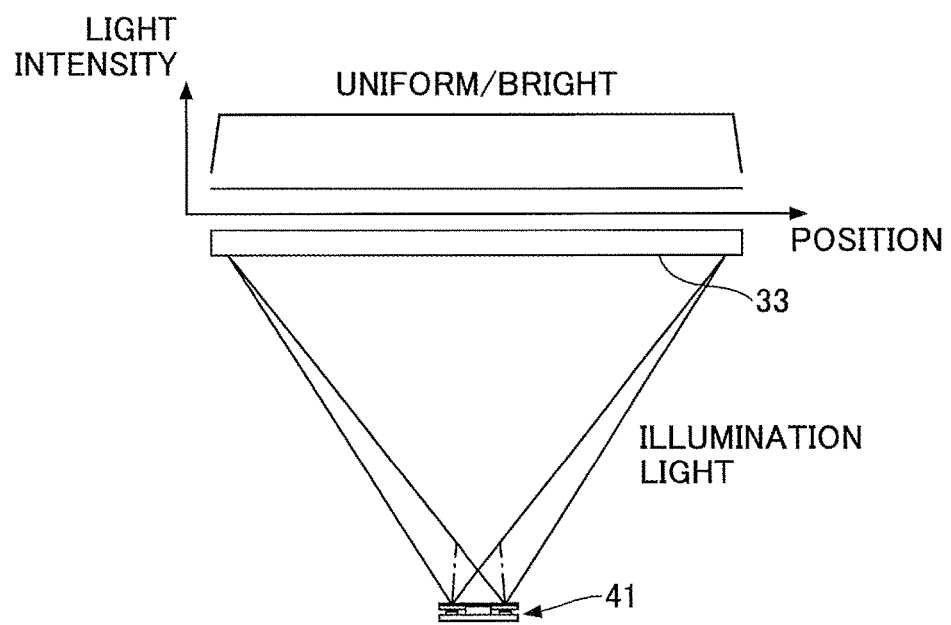
FIG. 12 is a schematic view illustrating the illumination light and an illumination distribution of a sensor for the illumination device.

FIG. 12 is a schematic view illustrating the illumination light and an illumination distribution of a sensor for the illumination device. As illustrated in FIG. 12, the illumination light from each of the LEDs 25 is diffracted by the diffraction optical element 26 and irradiated on the illuminating region 33 of the biometric capturing target by overlapping the irradiating regions 31-1 through 31-8 as illustrated in FIG. 7. The illumination light is diffracted by the diffraction optical element 26 so that leaked light will not be generated and wasted at the outer side of the illuminating region 33. In other words, the diffraction optical element 26 diffracts the illumination light so as not to extend outside the illuminating region 33. For this reason, the intensity of the illumination light can be prevented from decreasing throughout the entire illuminating region 33. As illustrated in an upper part of FIG. 12, the intensity (arbitrary units) of the illumination light is approximately uniform regardless of the position (arbitrary units) on the illuminating region 33.

Figure 13:
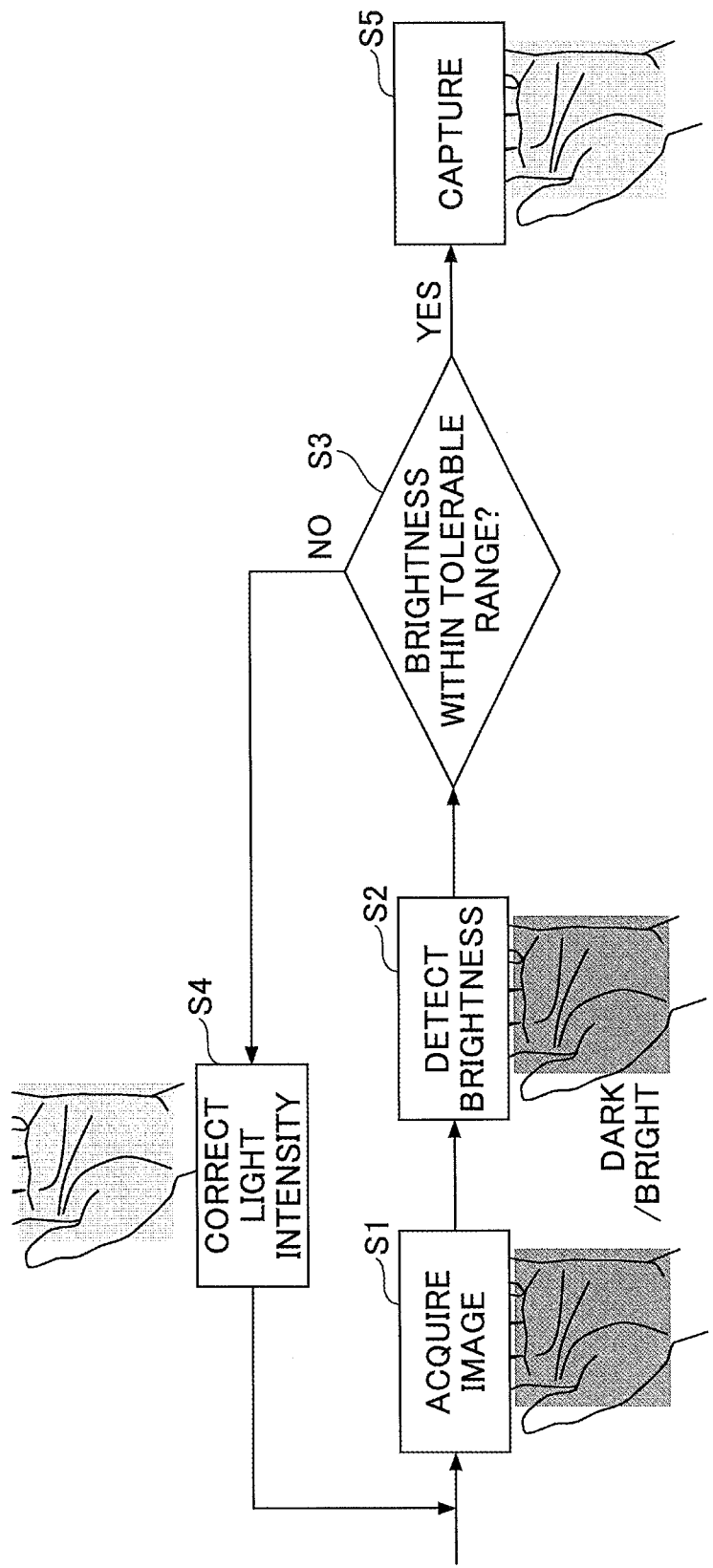
FIG. 13 is a flow chart for explaining an example of an image processing of the biometric authentication apparatus provided with the sensor for the illumination device illustrated in FIG. 11.

FIG. 13 is a flow chart for explaining an example of an image processing of the biometric authentication apparatus provided with the sensor for the illumination device illustrated in FIG. 11. For example, each of steps S1 through S5 illustrated in FIG. 13 may be executed by a processor, such as a CPU (Central Processing Unit) which will be described later. In a state in which the sensor 41 for the illumination device illuminates the illuminating region 33 by the illuminating light as illustrated in FIG. 12, the processor in step S1 acquires the biometric image, including the illuminating region 33, captured by the imaging optical system 22. The processor in step S2 detects the brightness of the acquired biometric image. The processor in step S3 judges whether the detected brightness is within a tolerable range, that is, whether the light intensity distribution is a predetermined uniform distribution. When the judgment result in step S3 is NO, the processor in step S4 controls the LEDs 25 of the illuminating optical system 23 to correct the intensity of the illumination light, and the process returns to step S1. The control of the LEDs 25 may be performed for each of the LEDs 25, or for each of LED groups formed by the LEDs 25 corresponding to each of the irradiating regions 31-1 through 31-8. On the other hand, when the judgment result in step S3 is YES, the processor in step S5 controls the imaging optical system 22 and captures the biometric image including the illuminating region 33. Accordingly, in a case in which the brightness of the biometric image is within the tolerable range, this biometric image is captured to acquire the input image. On the other hand, in a case in which the brightness of the biometric image is outside the tolerable range, current values supplied to the LEDs 25 are adjusted to correct the intensity of the illumination light, the biometric image is acquired again thereafter, and the processor repeats the processes of steps S1 through S4 until the brightness of the acquired biometric image falls within the tolerable range. In the case in which the brightness of the acquired biometric image is darker than the tolerable range (that is, too dark), the current values supplied to the LEDs 25 are increased to increase the light intensity of the illumination light. On the other hand, in the case in which the brightness of the acquired biometric image is brighter than the tolerable range (that is, too bright), the current values supplied to the LEDs 25 are decreased to decrease the light intensity of the illumination light. In FIG. 13, images illustrated below steps S1, S2, and S5 and above step S4 represent the palm which is an example of the biometric image.

Figure 14:
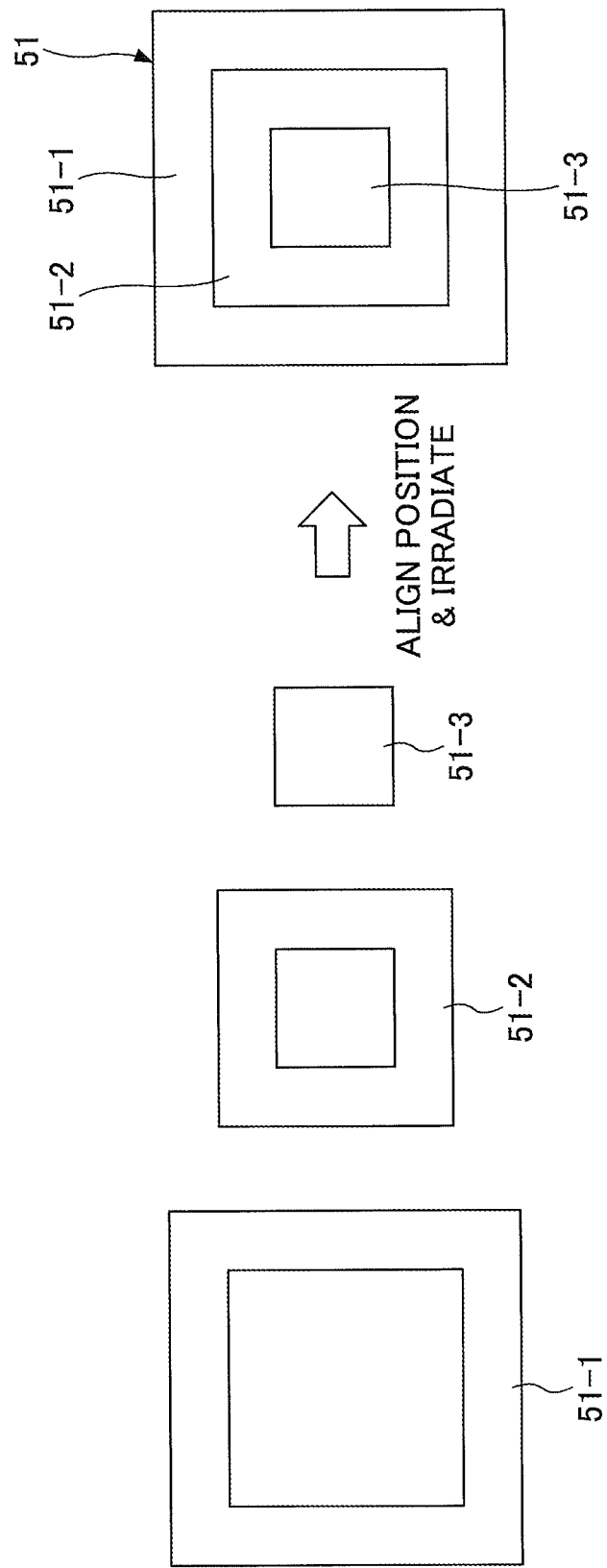
FIG. 14 is a diagram for explaining an example in which the diffraction optical element diffracts light from LEDs into illumination light that irradiates three irradiating regions.

FIG. 14 is a diagram for explaining an example in which the diffraction optical element diffracts the light from LEDs into the illumination light that irradiates three irradiating regions. In this example, the LEDs 25 are grouped into a plurality of LED groups. The diffraction optical element 26 diffracts light from a first LED group to a first irradiating region 51-1 having a frame shape similar to that of an outer part of the illuminating region 33, diffracts light from a second LED group to a second irradiating region 51-2 having a frame shape similar to that of an inner part of the first irradiating region 51-1, and diffracts light from a third LED group to a third irradiating region 51-3 having a rectangular shape similar to that of an inner part of the second irradiating region 51-2. The light intensity distribution in each of the irradiating regions 51-1, 51-2, and 51-3 is uniform, and the light intensities are the same for each of the irradiating regions 51-1, 51-2, and 51-3. The light intensity distribution of a single irradiating region 51 of the sensor 41 for the illumination device, obtained by aligning the positions of the irradiating regions 51-1, 51-2, and 51-3 on the biometric capturing target and overlapping the irradiating regions 51-1, 51-2, and 51-3, is uniform. In addition, the shape of this single irradiating region 51 is the same as that of the illuminating region 33. The number and the shape of the irradiating regions are not limited to a certain number and a certain shape. Further, the diffraction optical element 26 may have the arrangement illustrated in FIG. 6A, or the arrangement illustrated in FIG. 6B.

Figure 15:
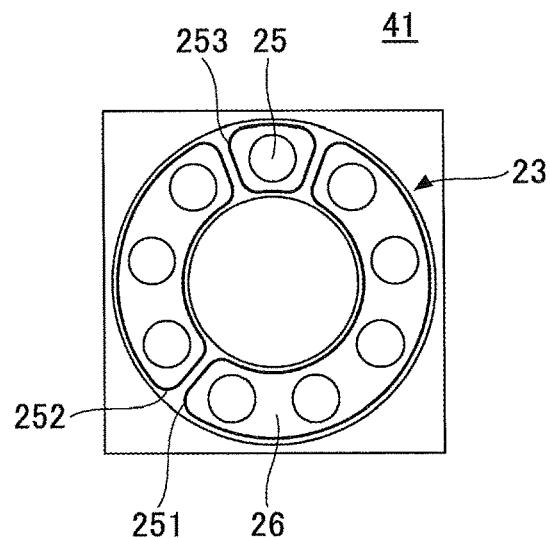
FIG. 15 is a top view illustrating an example of the sensor for the illumination device that diffracts the light from the LEDs into the illumination light that irradiates the three irradiating regions illustrated in FIG. 14.
Figure 16:
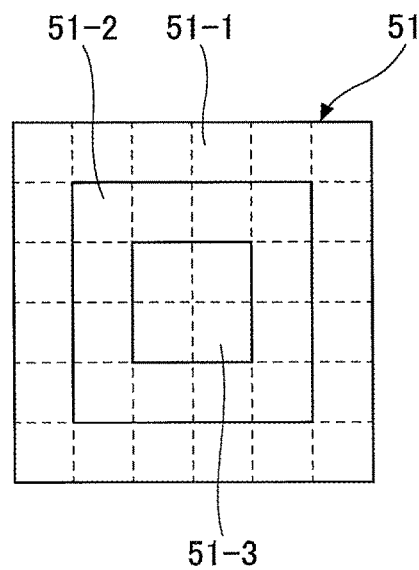
FIG. 16 is a diagram illustrating an example of segmentation of the illuminating region into illuminating region parts.

FIG. 15 is a top view illustrating an example of the sensor for the illumination device that diffracts the light from the LEDs into the illumination light that irradiates the three irradiating regions illustrated in FIG. 14. In FIG. 15, those parts that are the same as those corresponding parts in FIGS. 11A and 11B are designated by the same reference numerals, and a description thereof will be omitted. In this example, the illuminating optical system 23 includes nine LEDs 25. A first LED group 251 includes five LEDs 25, a second LED group 252 includes three LEDs 25, and a third LED group 253 includes one LED 25. The illuminating region 33 is segmented into 6×6=36 illuminating region parts, as illustrated in FIG. 16.

The diffraction optical element 26 diffracts light from the first, second, and third LED groups 251, 252, and 253, so that the light from the first, second, and third LED groups 251, 252, and 253 is irradiated on irradiating region parts corresponding to the first, second, and third irradiating regions 51-1, 51-2, and 51-3 described above. FIG. 16 is a diagram illustrating an example of segmentation of the illuminating region into the illuminating region parts. In this example, the first irradiating region 51-1 includes twenty illuminating region parts irradiated by the light from the five LEDs 25 included in the first LED group 251, the second irradiating region 51-2 includes twelve illuminating region parts irradiated by the light from the three LEDs 25 included in the second LED group 252, and the third irradiating region 51-3 includes four irradiating region parts irradiated by the light from the one LED 25 included in the third LED group 253.

Figure 17A:
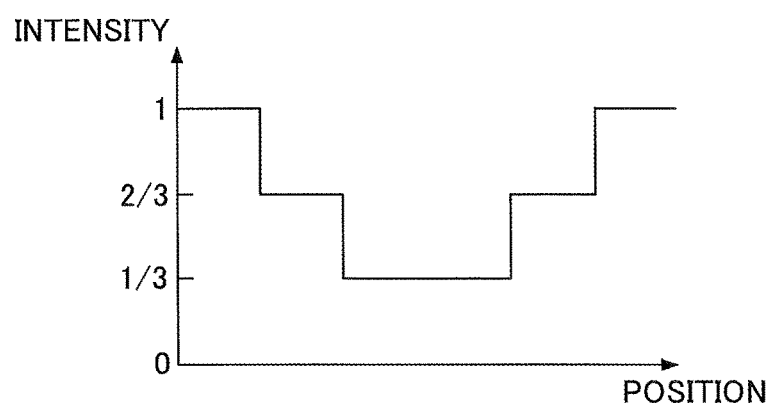
FIGS. 17A and 17B are diagrams for explaining an example of the light intensity for each LED group.
Figure 17B:
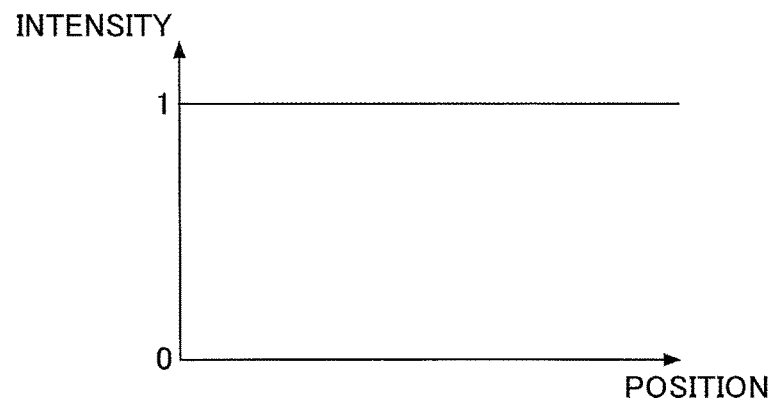

FIGS. 17A and 17B are diagrams for explaining an example of the light intensity for each LED group. FIG. 17A illustrates the light intensity (arbitrary units) for each of the LED groups 251, 252, and 253, and FIG. 17B illustrates for comparison purposes the light intensity (arbitrary units) for a case in which the light intensities from all of the nine LEDs 25 are the same. In FIGS. 17A and 17B, the abscissa indicates the position (arbitrary units) on the illuminating region 33. FIG. 17A illustrates the light intensity distribution for a case in which the intensity of the light from each of the LEDs 25 in the first LED group 251 is "1", the intensity of the light from each of the LEDs 25 in the second LED group 252 is "⅔", and the intensity of the light from the LED 25 in the third LED group 253 is "⅓". Hence, in this case, the intensities of the light from the LEDs 25 of each of the LED groups 251, 252, and 253 differ, however, the sizes of the irradiating regions irradiated by the light from each of the LED groups 251, 252, and 253 also differ. For this reason, the light intensity distribution of the single irradiating region 51 of the sensor 41 for the illumination device, obtained by aligning the positions of the irradiating regions 51-1, 51-2, and 51-3 on the biometric capturing target and overlapping the irradiating regions 51-1, 51-2, and 51-3, becomes uniform. On the other hand, FIG. 17B illustrates the light intensity distribution for the case in which the intensities of the light from all of the LEDs 25 are the same.

The positional relationship of the LEDs 25, the diffraction optical element 26, and the illuminating region 33 in the sensor 41 for the illumination device illustrated in FIG. 15 may be the same as the positional relationship illustrated in FIGS. 9A and 9B. FIGS. 18A, 18B, and 18C are diagrams respectively illustrating measured results of the illuminating region parts of the illuminating region corresponding to the first, second, and third illuminating regions 51-1, 51-2, and 51-3. FIG. 18A illustrates the measured results for the illuminating region part of the illuminating region 33 corresponding to the first irradiating region 51-1, FIG. 18B illustrates the measured results for the illuminating region part of the illuminating region 33 corresponding to the second irradiating region 51-2, and FIG. 18C illustrates the measured results for the illuminating region part of the illuminating region 33 corresponding to the third irradiating region 51-3. In this example, the illuminating region 33 has a rectangular shape with a size of 110 mm×110 mm, the light emission surface of the LED 25 has a rectangular shape with a size of 3 mm×3 mm, and the light emission wavelength of the LED 25 is 545 nm. A gap between the LED 25 and the diffraction optical element 26 is 5 mm, and the substrate 261 of the diffraction optical element 261 is made of synthetic quarts and has a thickness of 2 mm. A gap between the diffraction optical element 26 and the illuminating region 33 is 50 mm.

Figures 19, 20:
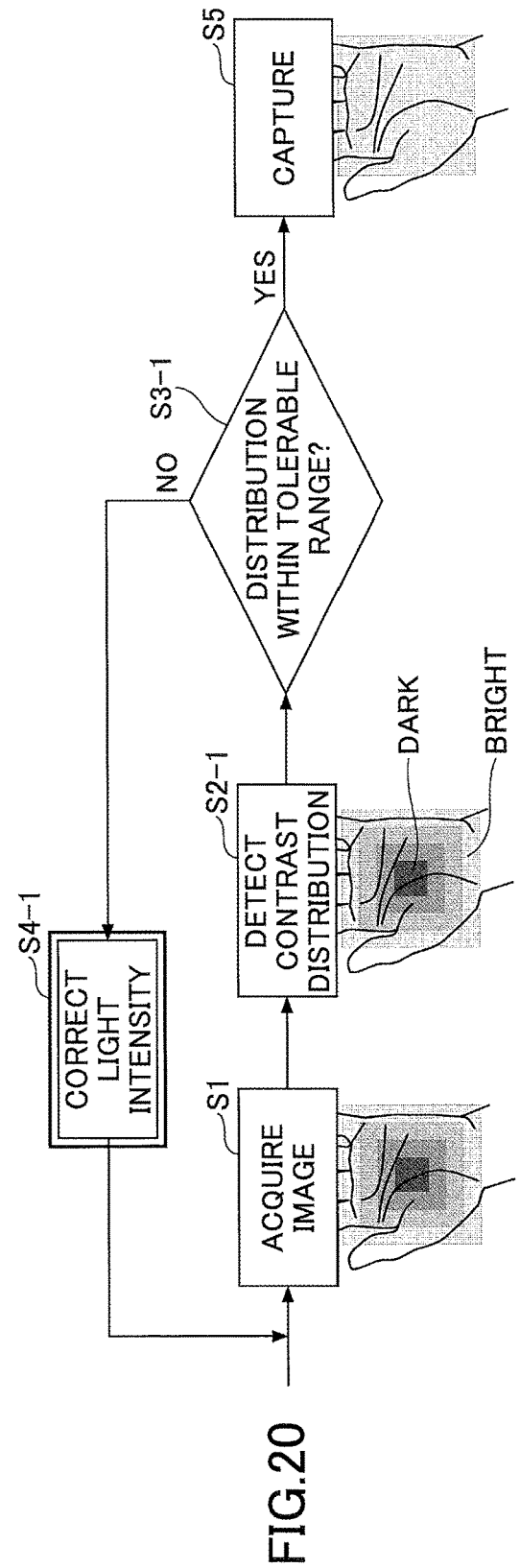
FIG. 19 is a diagram illustrating a pixel number PIX of the diffraction optical elements, a cell size of the cell, and a size of the diffraction optical elements respectively corresponding to FIGS. 18A, 18B, and 18C.
FIG. 20 is a flow chart for explaining an example of the image processing of the biometric authentication apparatus provided with the sensor for the illumination device illustrated in FIG. 15, including acquiring and capturing an image for authentication.

FIG. 19 is a diagram illustrating, for cases (a), (b), and (c), the pixel number PIX of the diffraction optical elements 26, the cell size of the cells 263, and the size of the diffraction optical elements 26 respectively corresponding to FIGS. 18A, 18B, and 18C. With respect to the first irradiating region 51-1, in a case in which the diffraction optical element 26 has a rectangular shape with a size of 5.00 mm×5.00 mm, the pixel number PIX of the diffraction optical element 26 is 200, and the cell 263 has a rectangular shape with a size of 0.025 mm×0.025 mm, the light intensity distribution is uniform in the illuminating region 33 that is larger than the area of the sensor 41 for the illumination device in the top view, as illustrated by hatchings in FIG. 18A. With respect to the second irradiating region 51-2, in a case in which the diffraction optical element 26 has the rectangular shape with the size of 5.00 mm×5.00 mm, the pixel number PIX of the diffraction optical element 26 is 175, and the cell 263 has a rectangular shape with a size of 0.0285 mm×0.0285 mm, the light intensity distribution is uniform in the illuminating region 33 that is larger than the area of the sensor 41 for the illumination device in the top view, as illustrated by hatchings in FIG. 18B. With respect to the irradiating region 51-3, in a case in which the diffraction optical element 26 has a rectangular shape with a size of 4.95 mm×4.95 mm, the pixel number PIX of the diffraction optical element 26 is 150, and the cell 263 has a rectangular shape with a size of 0.033 mm×0.033 mm, the light intensity distribution is uniform in the illuminating region 33 that is larger than the area of the sensor 41 for the illumination device in the top view, as illustrated by hatchings in FIG. 18C. In FIGS. 18A through 18C, Y [m] corresponds to the position along an up-and-down direction in FIG. 9A, for example, and X [m] corresponds to the position along a direction perpendicular to the paper (or drawing surface) in FIG. 9A, for example.

Accordingly, the light intensity distribution of the single irradiating region 51 of the sensor 41 for the illumination device, obtained by overlapping the irradiating regions 51-1, 51-2, and 51-3 having different sizes, different shapes, and different positions, is uniform. In addition, the shape of this single irradiating region 51 is the same as that of the illuminating region 33. Moreover, the intensity of the illumination light can be controlled for each of the irradiating regions 51-1, 51-2, and 51-3 according to the size of the concavo-convex of the biometric capturing target, the position of the concavo-convex of the biometric capturing target, the reflectivity of the skin, or the like within the illuminating region 33. For this reason, even in a case in which the optimum illumination condition with respect to the individual biometric capturing target differs according to the size of the concavo-convex of the biometric capturing target (for example, large or small muscles on the palm), the position of the concavo-convex of the biometric capturing target, the quality of the captured image that is acquired can be maintained constant. As a result, it is possible to prevent the authentication accuracy of the biometric authentication apparatus from deteriorating, regardless of the combination of the size of the concavo-convex of the biometric capturing target and the illumination condition.

FIG. 20 is a flow chart for explaining an example of the image processing of the biometric authentication apparatus provided with the sensor for the illumination device illustrated in FIG. 15, including the acquiring and capturing the image for authentication. For example, each of steps S1 through S5 illustrated in FIG. 20 may be executed by the processor, such as the CPU which will be described later. In a state in which the sensor 41 for the illumination device illuminates the illuminating region 33 by the illuminating light, the processor in step S1 acquires the biometric image, including the illuminating region 33, captured by the imaging optical system 22. The processor in step S2-1 detects the brightness of the acquired biometric image for each of the irradiating regions 51-1, 51-2, and 51-3. The processor in step S3-1 judges whether the detected brightness is within a tolerable range, that is, whether the light intensity distribution is a predetermined uniform distribution, for each of the irradiating regions 51-1, 51-2, and 51-3. When the judgment result in step S3-1 is NO, the processor in step S4-1 controls the LEDs 25 of the illuminating optical system 23 for each of the LED groups 251, 252, and 253 to independently correct the intensity of the illumination light for each of the irradiating regions 51-1, 51-2, and 51-3, and the process returns to step S1. On the other hand, when the judgment result in step S3-1 is YES, the processor in step S5 controls the imaging optical system 22 and captures the biometric image including the illuminating region 33. Accordingly, in a case in which the brightness of the biometric image for each of the irradiating regions 51-1, 51-2, and 51-3 is within the tolerable range, this biometric image is captured to acquire the input image. On the other hand, in a case in which the brightness of the biometric image for each of the irradiating regions 51-1, 51-2, and 51-3 is outside the tolerable range, current values supplied to the LEDs 25 are adjusted for each of the LED groups 251, 252, and 253 to correct the intensity of the illumination light, the biometric image is acquired again thereafter, and the processor repeats the processes of steps S1 through S4-1 until the brightness of the acquired biometric image for each of the irradiating regions 51-1, 51-2, and 51-3 falls within the tolerable range. In the case in which the brightness of the acquired biometric image is darker than the tolerable range (that is, too dark), the current values supplied to the LEDs 25 are increased for each of the LED groups 251, 252, and 253 to increase the light intensity of the illumination light. On the other hand, in the case in which the brightness of the acquired biometric image is brighter than the tolerable range (that is, too bright), the current values supplied to the LEDs 25 are decreased for each of the LED groups 251, 252, and 253 to decrease the light intensity of the illumination light.

In FIG. 20, images illustrated below steps S1, S2-1, and S5 represent the palm which is an example of the biometric image. For example, in a case in which the illumination light illuminates the palm 11B illustrated in FIG. 4B, the peripheral part of the palm 11B may become bright while the central part of the palm 11B may become dark, due to the concavo-convex of the palm 11B, thereby making it difficult to always obtain a satisfactory illumination distribution. However, in this example, the illumination condition can be adjusted by correcting the intensity of the illumination light for each of the irradiating regions 51-1, 51-2, and 51-3, in order to suppress a phenomenon in which the quality of captured image of the palm 11B becomes partially different, such as in regions indicated by halftone below step S2-1 in FIG. 20. Hence, it is possible to prevent the authentication accuracy from deteriorating, without increasing the number of LEDs 25 and without using the high-output LEDs for the LEDs 25.

Figure 21:
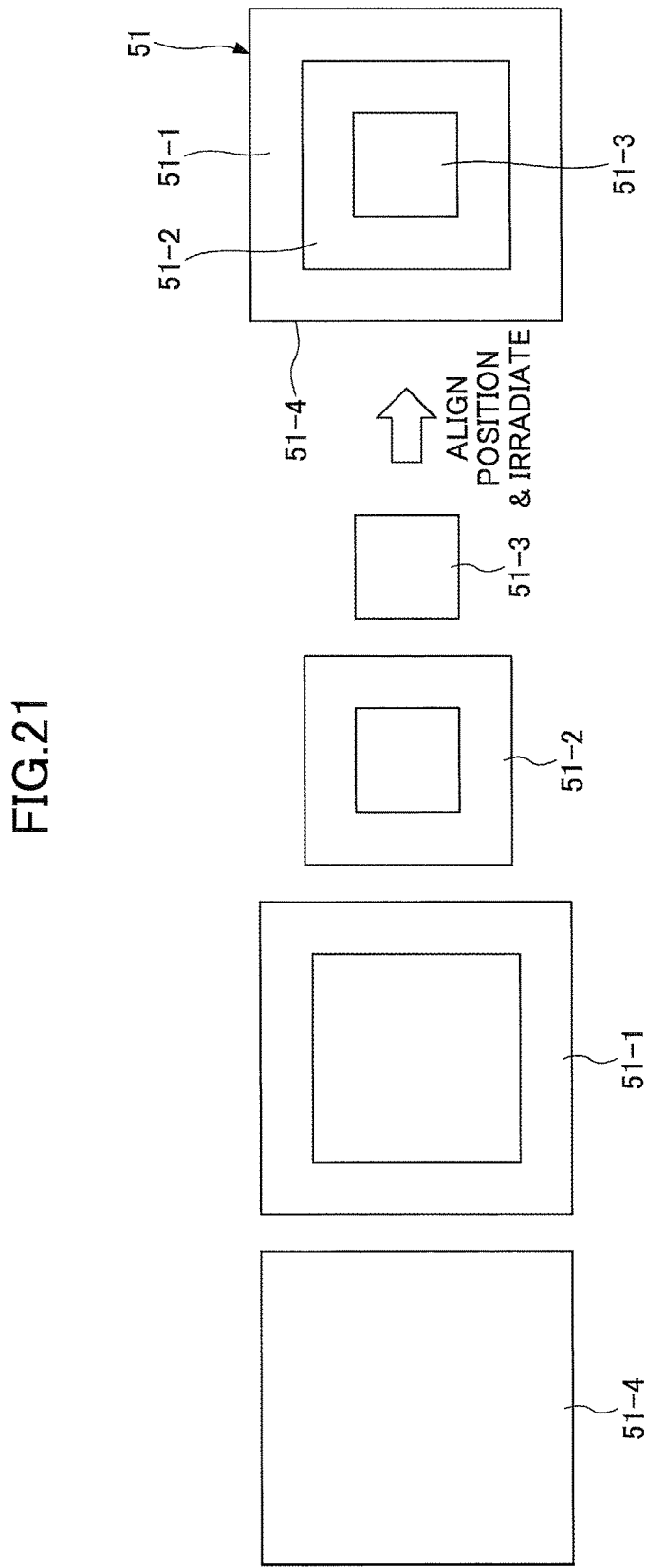
FIG. 21 is a diagram for explaining an example in which the diffraction optical element diffracts light from the LEDs into illumination light that irradiates four illuminating regions.

FIG. 21 is a diagram for explaining an example in which the diffraction optical element diffracts the light from the LEDs into illumination light that irradiates four illuminating regions. In FIG. 21, those parts that are the same as those corresponding parts in FIG. 14 are designated by the same reference numerals, and a description thereof will be omitted. In this example, the diffraction optical element 26 diffracts light from a first LED group to a first irradiating region 51-1 having a frame shape similar to that of an outer part of the illuminating region 33, diffracts light from a second LED group to a second irradiating region 51-2 having a frame shape similar to that of an inner part of the first irradiating region 51-1, diffracts light from a third LED group to a third irradiating region 51-3 having a frame shape similar to that of an inner part of the second irradiating region 51-2, and diffracts light from a fourth LED group to a fourth irradiating region 51-4 having a rectangular shape similar to the rectangular shape that is obtained by overlapping the first, second, and third irradiating regions 51-1, 51-2, and 51-3. The light intensity distribution in each of the irradiating regions 51-1, 51-2, 51-3, and 51-4 is uniform, and the light intensities are the same for each of the irradiating regions 51-1, 51-2, 51-3, and 51-4. The light intensity distribution of a single irradiating region 51 of the sensor 41 for the illumination device, obtained by aligning the positions of the irradiating regions 51-1, 51-2, 51-3, and 51-4 on the biometric capturing target and overlapping the irradiating regions 51-1, 51-2, 51-3, and 51-4, is uniform. In addition, the shape of this single irradiating region 51 is the same as that of the illuminating region 33. The number and the shape of the irradiating regions are not limited to a certain number and a certain shape. Further, the diffraction optical element 26 may have the arrangement illustrated in FIG. 6A, or the arrangement illustrated in FIG. 6B.

An image processing of the biometric authentication apparatus provided with the diffraction optical element 26 that diffracts the light from the LEDs 25 to the illumination light that irradiates the irradiating regions 51-1, 51-2, 51-3, and 51-4 illustrated in FIG. 21, including acquiring and capturing the image for authentication, may combine the processes illustrated in FIGS. 13 and 20, in order to correct the brightness and correct the light intensity distribution. Hence, a more delicate control of the brightness and the light intensity distribution becomes possible.

Figure 22:
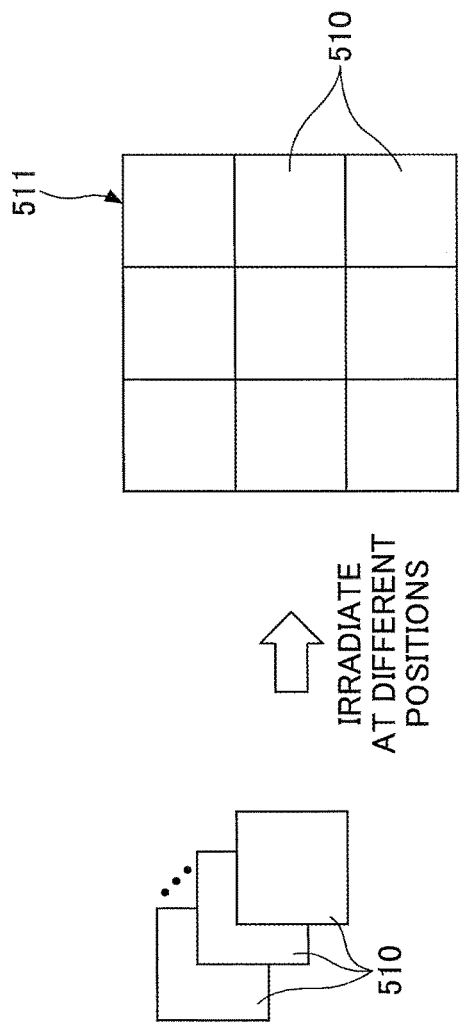
FIG. 22 is a diagram for explaining an example in which the diffraction optical element diffracts light from the LEDs into illumination light that irradiates nine illuminating regions.

FIG. 22 is a diagram for explaining an example in which the diffraction optical element diffracts the light from the LEDs into illumination light that irradiates nine illuminating regions. In this example, the diffraction optical element 26 diffracts light from first through ninth LED groups to first through ninth irradiating regions 510 corresponding to rectangular regions (smaller than the illuminating region 33) located at mutually different positions of the illuminating region 33. In a case in which the sensor 41 for the illumination device illustrated in FIG. 15 is used, the first through ninth LED groups may respectively be formed by a corresponding one of the nine LEDs 25. Each of the irradiating regions 510 has the same shape and the same size. The light intensity distribution is uniform in each of the irradiating regions 510, and the light intensity is the same in each of the irradiating regions 510. The light intensity distribution of a single irradiating region 511 of the sensor 41 for the illumination device, obtained by aligning the positions of each of the irradiating regions 510 on the biometric capturing target and overlapping the irradiating regions 510, is uniform. In addition, the shape of this single irradiating region 511 is the same as that of the illuminating region 33. The number and the shape of the irradiating regions 510 are not limited to a certain number and a certain shape. Further, the diffraction optical element 26 may have the arrangement illustrated in FIG. 6A, or the arrangement illustrated in FIG. 6B.

An image processing of the biometric authentication apparatus provided with the diffraction optical element 26 that diffracts the light from the LEDs 25 to the illumination light that irradiates the irradiating regions 510 illustrated in FIG. 22, including acquiring and capturing the image for authentication, may combine the processes illustrated in FIGS. 13 and 20, in order to correct the brightness and correct the light intensity distribution. Hence, a more delicate control of the brightness and the light intensity distribution becomes possible.

Figure 23:
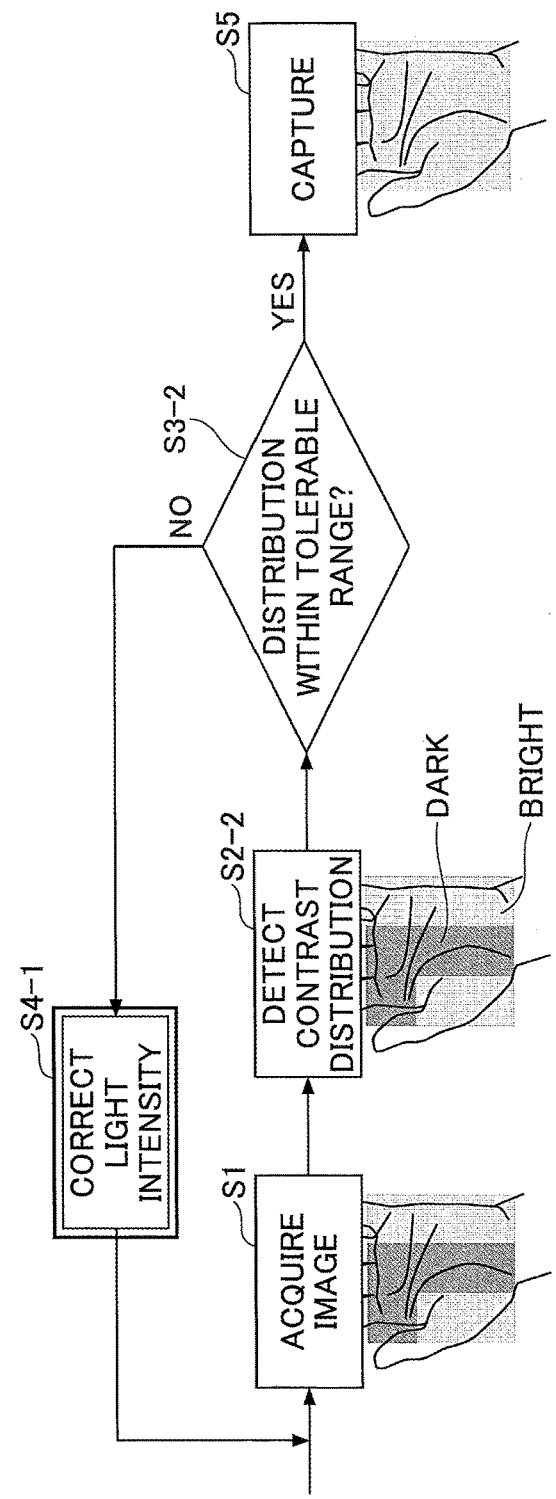
FIG. 23 is a flow chart for explaining an example of an image processing of the biometric authentication apparatus provided with the diffraction optical element that diffracts light into the illumination light irradiating the illuminating regions illustrated in FIG. 22, including acquiring and capturing the image for authentication.

FIG. 23 is a flow chart for explaining an example of the image processing of the biometric authentication apparatus provided with the diffraction optical element that diffracts light into the illumination light irradiating the illuminating regions illustrated in FIG. 22, including acquiring and capturing the image for authentication. For example, each of steps S1 through S5 illustrated in FIG. 23 may be executed by the processor, such as the CPU which will be described later. In a state in which the sensor 41 for the illumination device illuminates the illuminating region 33 by the illuminating light, the processor in step S1 acquires the biometric image, including the illuminating region 33, captured by the imaging optical system 22. The processor in step S2-2 detects the brightness of the acquired biometric image for each of the nine irradiating regions 510. The processor in step S3-2 judges whether the detected brightness is within a tolerable range, that is, whether the light intensity distribution is a predetermined uniform distribution, for each of the nine irradiating regions 510. When the judgment result in step S3-2 is NO, the processor in step S4-1 controls the LEDs 25 of the illuminating optical system 23 for each of the nine LED groups to independently correct the intensity of the illumination light for each of the nine irradiating regions 510, and the process returns to step S1. On the other hand, when the judgment result in step S3-2 is YES, the processor in step S5 controls the imaging optical system 22 and captures the biometric image including the illuminating region 33. Accordingly, in a case in which the brightness of the biometric image for each of the nine irradiating regions 510 is within the tolerable range, this biometric image is captured to acquire the input image. On the other hand, in a case in which the brightness of the biometric image for each of the nine irradiating regions 510 is outside the tolerable range, current values supplied to the LEDs 25 are adjusted for each of the nine LED groups to correct the intensity of the illumination light, the biometric image is acquired again thereafter, and the processor repeats the processes of steps S1 through S4-1 until the brightness of the acquired biometric image for each of the nine irradiating regions 510 falls within the tolerable range. In the case in which the brightness of the acquired biometric image is darker than the tolerable range (that is, too dark), the current values supplied to the LEDs 25 are increased for each of the nine LED groups to increase the light intensity of the illumination light. On the other hand, in the case in which the brightness of the acquired biometric image is brighter than the tolerable range (that is, too bright), the current values supplied to the LEDs 25 are decreased for each of the nine LED groups to decrease the light intensity of the illumination light.

In FIG. 23, images illustrated below steps S1, S2-2, and S5 represent the palm which is an example of the biometric image. For example, in a case in which the illumination light illuminates the palm 11B illustrated in FIG. 4B, the peripheral part of the palm 11B may become bright while the central part of the palm 11B may become dark, due to the concavo-convex of the palm 11B, thereby making it difficult to always obtain a satisfactory illumination distribution. However, in this example, the illumination condition can be adjusted by correcting the intensity of the illumination light for each of the nine irradiating regions 510, in order to suppress a phenomenon in which the quality of captured image of the palm 11B becomes partially different, such as in regions indicated by halftone below step S2-2 in FIG. 23. Hence, it is possible to prevent the authentication accuracy from deteriorating, without increasing the number of LEDs 25 and without using the high-output LEDs for the LEDs 25.

Figure 24:
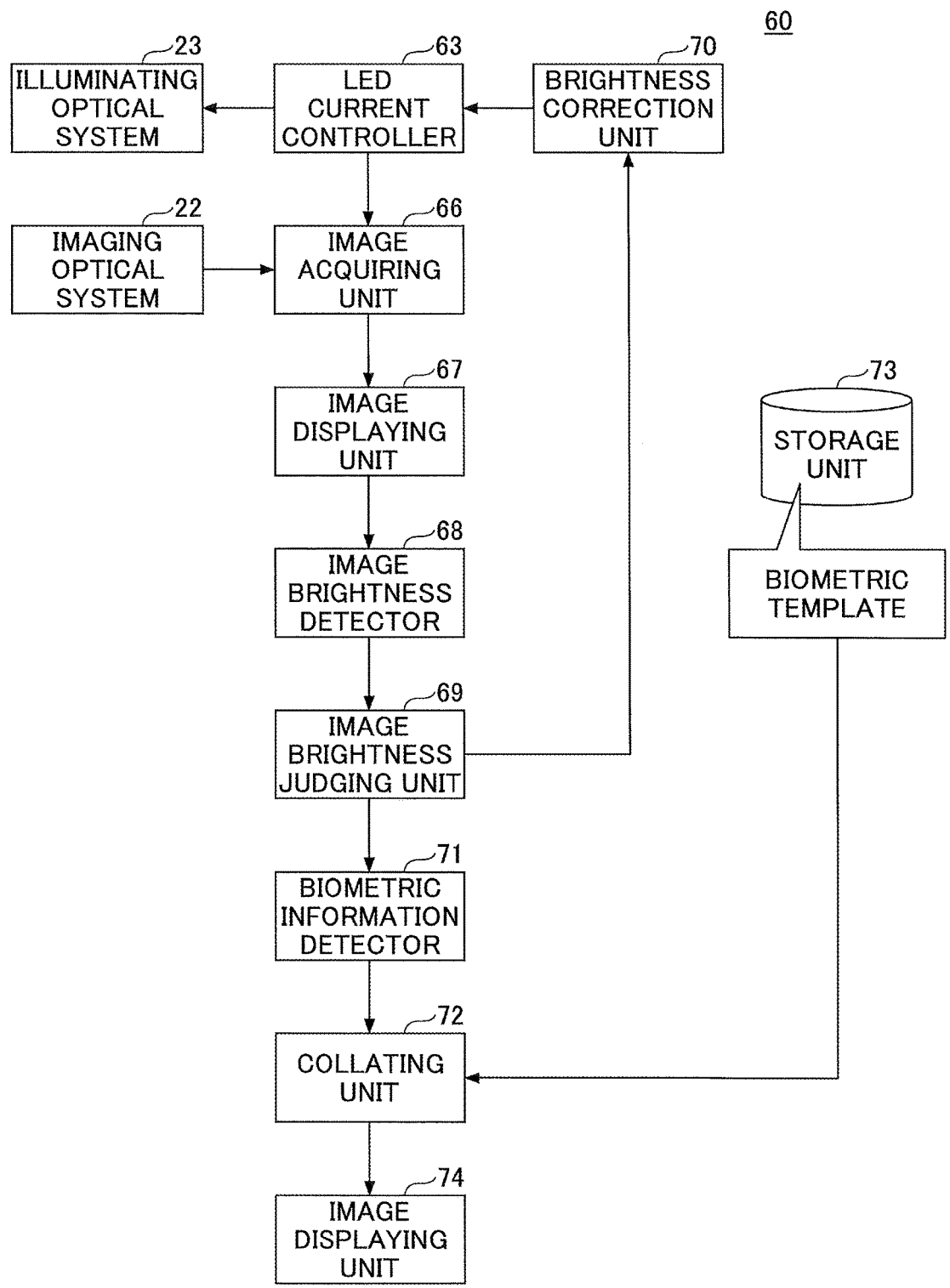
FIG. 24 is a block diagram illustrating an example of the biometric authentication apparatus in one embodiment.

FIG. 24 is a block diagram illustrating an example of the biometric authentication apparatus in one embodiment. A biometric authentication apparatus 60 illustrated in FIG. 24 includes the illuminating optical system 23, an LED current controller 63, an image acquiring unit 66, an image displaying unit 67, an image brightness detector 68, an image brightness judging unit 69, a brightness correction unit 70, a biometric information detector 71, a collating unit (or matching unit) 72, a storage unit 73, and an image displaying unit 74. The storage unit 73 stores biometric templates that are prepared in advance, and the collating unit 72 collates the biometric information detected by the biometric information detector 71 with the stored biometric templates. The image displaying unit 74 displays a collated result (or matched result) of the collating unit 72 or a biometric image.

The LED current controller 63 and the brightness correction unit 70 forms an illuminating optical system controller. The image acquiring unit 66, the image displaying unit 67, the image brightness detector 68, and the image brightness judging unit 69 form an imaging optical system controller.

When a user places the user's hand, which is an example of the biometric capturing target, within a region that includes the illuminating region 33 of the illuminating optical system 23, the biometric authentication apparatus 60 detects the biometric capturing target (or biometric authenticating target) by a known method, and the LED current controller 63 turns ON the LEDs 25 of the illuminating optical system 23. Hence, the light from the LEDs 25 is diffracted by the diffraction optical element 26 to irradiate the irradiating regions 41-1 through 31-8 illustrated in FIG. 7, or the irradiating regions 51-1 through 51-3 illustrated in FIG. 14, or the irradiating regions 51-1 through 51-4 illustrated in FIG. 21, or the irradiating regions 510 illustrated in FIG. 22. The imaging optical system 22 captures the capturing biometric target (user's palm in this example), including the illuminating region 33, and the image acquiring unit 66 executes step S1 described above to acquire the input image that is captured. In addition, the image displaying unit 67 displays the acquired input image on a display unit (not illustrated). The image displaying unit 67 may be omitted.

The image brightness detector 68 executes step S2 described above to detect the brightness of the acquired input image, or executes step S2-1 or S2-2 described above to detect the uniformity of the light intensity distribution of the acquired input image. The image brightness judging unit 69 executes step S3 described above to judge whether the detected brightness of the acquired input image is within the tolerable range, or executes step S3-1 or S3-2 described above to judge whether the detected uniformity of the light intensity distribution of the acquired input image is within the tolerable range. When the image brightness judging unit 69 judges that the detected brightness of the acquired input image falls outside the tolerable range, or judges that the detected uniformity of the light intensity distribution of the acquired input image falls outside the tolerable range, the image brightness judging unit 69 controls the brightness correction unit 70 according to this judgment result. In other words, the image brightness judging unit 69 judges whether the detected brightness of the acquired input image satisfies a reference (or standard). The brightness correction unit 70 executes step S4 or S4-1 described above, under the control of the image brightness judging unit 69, to correct the brightness or the uniformity of the light intensity distribution. In other words, the brightness correction unit 70 corrects the current output from the LED current controller 63, and the LEDs 25 are driven by the corrected current output from the LED current controller 63, so that the detected brightness of the acquired input image falls within the tolerable range, or the detected uniformity of the light intensity distribution of the acquired input image falls within the tolerable range. The above described processes, from the acquiring of the input image up to the judging of the brightness of the input image or the uniformity of the light intensity distribution of the input image, are repeated until the image brightness judging unit 69 judges that the detected brightness of the input image falls within the tolerable range, or judges that the detected uniformity of the light intensity distribution of the input image falls within the tolerable range.

When the image brightness judging unit 69 judges that the detected brightness of the input image falls within the tolerable range, or judges that the detected uniformity of the light intensity distribution of the input image falls within the tolerable range, the biometric information detector 71 detects the biometric information from the input image acquired by the image acquiring unit 66. The image acquiring unit 66 acquires the input image be executing step S5 described above, for example. The collating unit 72 collates the detected biometric information with the biometric templates that are prestored in the storage unit 73, and the image displaying unit 74 displays the collated result of the collating unit 72 on the display unit. The image displaying unit 74 may display on the display unit a message or the like of the collated result including whether the detected biometric information matches one of the prestored biometric templates. The image displaying unit 74 is an example of an output device to output the collated result of the collating unit 72. The output device to output the collated result is not limited to the image displaying unit 74 that displays the collated result, and may be formed by a speech synthesis unit that outputs the collated result by speech, or the like, for example.

Figure 25:
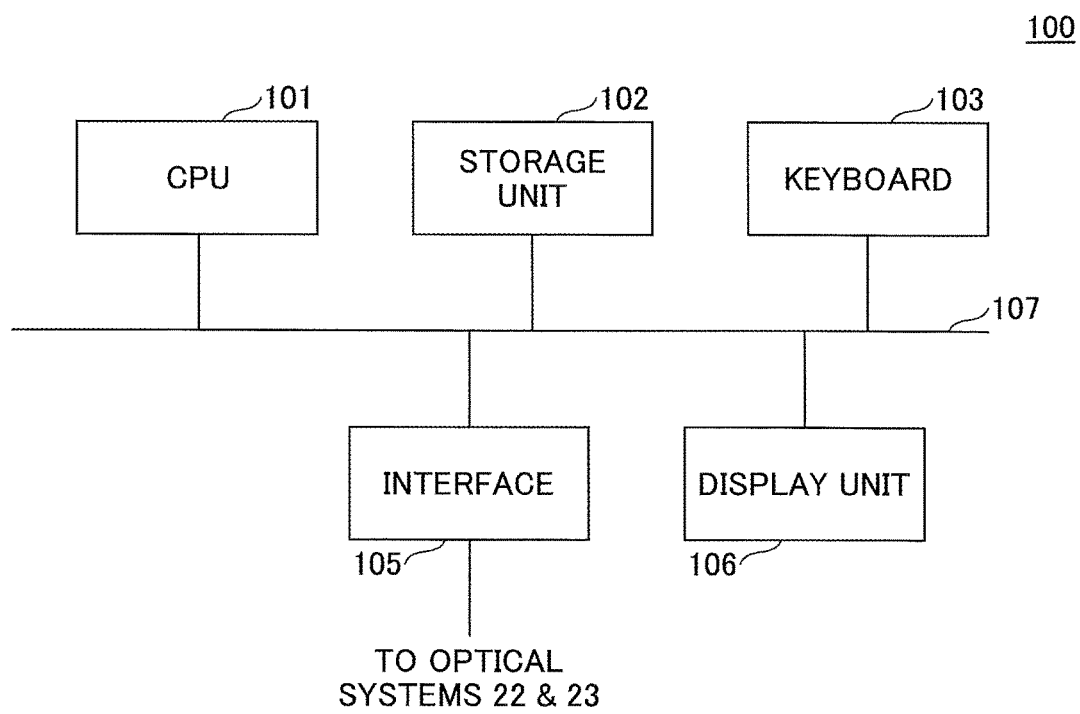
FIG. 25 is a block diagram illustrating an example of a configuration of a computer.

FIG. 25 is a block diagram illustrating an example of a configuration of a computer. The biometric authentication apparatus 60 illustrated in FIG. 24 may be formed by a computer 100 illustrated in FIG. 25 to perform a biometric authentication process. The computer 100 illustrated in FIG. 25 may be formed by a general-purposes computer, such as a personal computer, for example. The computer 100 may include a CPU 101, a storage unit 102, a keyboard 103 which is an example of an input device, an interface 105, and a display unit 106 which is an example of the output device. In this example, the CPU 101, the storage unit 102, the keyboard 103, the interface 105, and the display unit 106 are connected via a bus 107. However, the configuration of the computer 100 is not limited to the configuration employing the bus 107 for the connection. The imaging optical system 22 and the illuminating optical system 23 are connected to the interface 105, for example.

The storage unit 102 stores programs to the executed by the CPU 101, various kinds of data including the biometric templates, or the like. The storage unit 102 may be formed by any suitable non-transitory computer-readable storage medium, including a memory, a storage unit such as a HDD (Hard Disk Drive), or the like. The CPU 101 controls the entire computer 100 by executing one or more programs stored in the storage unit 102. The CPU 101 can perform all of the functions, or a part of the functions of the LED current controller 63, the image acquiring unit 66, the image displaying unit 67, the image brightness detector 68, the image brightness judging unit 69, the brightness correction unit 70, the biometric information detector 71, the collating unit 72, and the image displaying unit 74, by executing one or more programs. The CPU 101 can execute one or more programs to perform the processes of FIG. 13, FIG. 20, or FIG. 23, for example, in order to perform the functions of the illuminating optical system controller and the imaging optical system controller described above. The storage unit 102 may also perform the function of the storage unit 73.

The keyboard 103 is used to input commands and data to the CPU 101. The interface 105 is used to connect the computer 100 to an external apparatus. The display unit 106 displays various data with respect to the user (or operator) of the computer 100, under the control of the CPU 101. The various kinds of data displayed on the display unit 106 may include the input image that is acquired, the message of the collated result, or the like.

In each of the embodiments described above, the illuminating optical system includes a plurality of LEDs, however, the illuminating optical system may include a single LED. For example, in a case in which the illuminating optical system 23 includes a single LED 25 in FIGS. 5A and 5B, or FIGS. 11A and 11B, or FIG. 15, the number of assemblies of the diffraction gratings included in the diffraction optical element is not limited to as certain number, as long as the number of assemblies is greater than or equal to the number of irradiating regions to which the light from the single LED is to be diffracted.

In addition, in the case in which the illuminating optical system includes one or more LEDs, the light from the one or more LEDs can be diffracted to the plurality of irradiating regions by the diffraction optical element, and thus, the position of each LED is not limited to a certain position, and the arrangement of the plurality of LEDs does not necessarily need to have regularity or symmetry. For this reason, in a case in which each of the above described embodiments is applied to an electronic apparatus that includes a camera and a light source, for example, the diffraction optical element described above may be provided on a detachable adapter, and this detachable adapter may be connected to the light source part. In this case, the light from the light source can irradiate a predetermined illuminating region via the diffraction optical element, without being dependent on the positional relationship of a lens of the camera and the light source in the electronic apparatus, and the image within the predetermined illuminating region may be captured by the camera. Further, when the light source of the electronic apparatus in this case is a white light emitting diode, for example, the captured image may be used for face recognition or the like by improving the illumination efficiency by the adapter. Moreover, the adapter may be provided with a light source to output light having wavelengths or characteristics (or properties) selected according to the usage.

In each of the embodiments described above, the palm vein pattern is used as an example of the biometric information. However, the biometric information is not limited to the palm vein pattern, and may be an iris pattern of the human eye, or the like, for example.

According to each of the embodiments described above, the illumination of a relatively large illuminating region in which the light intensity distribution is uniform can be made using the illumination device having a relatively small size. In addition, in the biometric authentication apparatus having a relatively small size and provided with such an illumination device, the biometric authentication can be performed stably with a high accuracy.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," or "second," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An illumination device comprising:
    a light source including a plurality of light emitting elements provided on a surface of a substrate and configured to emit light; and
    a diffraction optical element having a plurality of diffraction gratings and configured to diffract the light from the light source into illumination light that illuminates an illuminated region of an illuminated target,
    wherein each of the plurality of light emitting elements emits light that irradiates two or more diffraction gratings among the plurality of diffraction gratings of the diffraction optical element,
    wherein the plurality of light emitting elements are grouped into a plurality of light emitting element groups including at least one light emitting element group that includes two or more light emitting elements,
    wherein each of the plurality of diffraction gratings diffracts the light emitted from each of the plurality of light emitting element groups to a corresponding one of a plurality of irradiated regions that are aligned to overlap a position of the illuminated region and are combined to form the illuminated region,
    wherein the plurality of irradiated regions have mutually different shapes and sizes, and a shape and a size of the plurality of irradiated regions in an overlapped state are identical to those of the illuminated region, and
    wherein the illuminated region is larger than an area occupied by the diffraction optical element and the light source in a top view of the illumination device viewed from above the surface of the substrate, and the area is parallel to the surface of the substrate.

2. The illumination device as claimed in claim 1, wherein the plurality of irradiated regions include an irradiated region having a shape and a size identical to those of the illuminated region.

3. The illumination device as claimed in claim 1, wherein a light intensity distribution of each of the plurality of irradiated regions is corrected by independently controlling a current value supplied to each of the plurality of light emitting elements in each of the plurality of light emitting element groups.

4. The illumination device as claimed in claim 1, wherein the diffraction optical element is an assembly of a number of diffraction gratings arranged in a matrix arrangement, wherein the number of diffraction gratings depends on a size of the illuminated region.

5. The illumination device as claimed in claim 1, wherein the light source includes a light emitting element having a wavelength band that is a single color.

6. The illumination device as claimed in claim 1, wherein the light source is arranged along a direction perpendicular to a light emitting surface of the diffraction optical element.

7. The illumination device as claimed in claim 6, wherein the diffraction optical element is arranged in a ring-shape on a plane parallel to the surface of the substrate.

8. The illumination device as claimed in claim 7, wherein the plurality of light emitting elements are arranged in the ring-shape on the surface of the substrate, and the diffraction optical element is provided on a light emitting surface side of the plurality of light emitting elements so as to oppose the plurality of light emitting elements.

9. The illumination device as claimed in claim 1, wherein a diffraction characteristic of the diffraction optical element is different for each of the plurality of diffraction gratings.

10. The illumination device as claimed in claim 9, wherein the plurality of irradiated regions are located at mutually different positions within the illuminated region.

11. The illumination device as claimed in claim 9, wherein the plurality of irradiated regions are located at overlapping positions within the illuminated region.

* * * * *